United States Patent
Hariton

(10) Patent No.: US 10,105,601 B1
(45) Date of Patent: Oct. 23, 2018

(54) SYSTEMS AND METHODS FOR RENDERING A VIRTUAL CONTENT OBJECT IN AN AUGMENTED REALITY ENVIRONMENT

(71) Applicant: Nicholas T. Hariton, Sherman Oaks, CA (US)

(72) Inventor: Nicholas T. Hariton, Sherman Oaks, CA (US)

( * ) Notice: Subject to any disclaimer, the term of this patent is extended or adjusted under 35 U.S.C. 154(b) by 0 days.

(21) Appl. No.: 15/796,716

(22) Filed: Oct. 27, 2017

(51) Int. Cl.
| | |
|---|---|
| G06F 17/00 | (2006.01) |
| A63F 13/53 | (2014.01) |
| G06T 19/20 | (2011.01) |
| G06T 15/20 | (2011.01) |
| A63F 13/52 | (2014.01) |
| A63F 13/26 | (2014.01) |
| A63F 13/216 | (2014.01) |

(Continued)

(52) U.S. Cl.
CPC ............ *A63F 13/53* (2014.09); *A63F 13/216* (2014.09); *A63F 13/26* (2014.09); *A63F 13/52* (2014.09); *G06T 15/20* (2013.01); *G06T 19/006* (2013.01); *G06T 19/20* (2013.01); *A63F 13/822* (2014.09); *A63F 2003/00996* (2013.01); *A63F 2300/8076* (2013.01); *G06F 3/1454* (2013.01); *G06T 13/20* (2013.01); *G06T 2200/24* (2013.01); *G06T 2215/16* (2013.01); *G06T 2219/024* (2013.01); *G07C 15/006* (2013.01); *H04L 67/38* (2013.01)

(58) Field of Classification Search
None
See application file for complete search history.

(56) References Cited

U.S. PATENT DOCUMENTS

| | | |
|---|---|---|
| 7,274,380 B2 | 9/2007 | Navab |
| 7,373,377 B2 | 5/2008 | Altieri |

(Continued)

OTHER PUBLICATIONS

Kato, et al., Marker Tracking and HMD Calibration for a Video-based Augmented Reality Conferencing System, in Proceedings of the 2nd International Workshop on Augmented Reality (IWAR 99). Oct. 1999, [retrieved Dec. 7, 2009] retrieved from the Internet<http://www.hitl.washington.edu/artoolkit/Papers/IWAR99.kato.pdf> (10 pages).

(Continued)

*Primary Examiner* — Ronald Laneau
(74) *Attorney, Agent, or Firm* — Sheppard Mullin Richter & Hampton LLP

(57) ABSTRACT

Systems and methods for rendering of a virtual content object in an augmented reality environment based on a physical marker are discussed herein. Virtual content objects may be rendered by a display device in an augmented reality environment based on the field of view seen through the display device and a position of a marker (and one or more linkage points associated with the marker) in the real world. When rendered in the augmented reality environment, the virtual content objects may be visualized from any angle, from the exterior or interior of the object, and manipulated in response to user input. Virtual content objects and/or user visualizations of virtual content objects may be shared with other users (local and/or remote), enabling multiple users to potentially build, modify, and/or interact with a virtual content object simultaneously and/or cooperatively.

16 Claims, 5 Drawing Sheets

(51) Int. Cl.
  G06T 19/00 (2011.01)
  *G07C 15/00* (2006.01)
  *G06F 3/14* (2006.01)
  *G06T 13/20* (2011.01)
  *H04L 29/06* (2006.01)
  *A63F 13/822* (2014.01)
  *A63F 3/00* (2006.01)

(56) References Cited

U.S. PATENT DOCUMENTS

| | | | |
|---|---|---|---|
| 7,774,027 | B2 | 8/2010 | Parikh |
| 8,139,067 | B2 | 3/2012 | Anguelov |
| 8,228,325 | B2 | 7/2012 | Altieri |
| 8,275,590 | B2 | 9/2012 | Szymczyk |
| 8,451,266 | B2 | 5/2013 | Hertenstein |
| 8,458,028 | B2 | 6/2013 | Altieri |
| 8,462,198 | B2 | 6/2013 | Lin |
| 8,473,835 | B2 | 6/2013 | Hariton |
| 9,001,118 | B2 | 4/2015 | Molyneaux |
| 9,041,622 | B2 | 5/2015 | McCulloch |
| 9,230,367 | B2 | 1/2016 | Stroila |
| 9,251,626 | B2 | 2/2016 | Wang |
| 9,323,325 | B2 | 4/2016 | Perez |
| 9,324,318 | B1 | 4/2016 | Bunn |
| 9,345,957 | B2 | 5/2016 | Geisner |
| 9,354,702 | B2 | 5/2016 | Mullins |
| 9,374,788 | B2 | 6/2016 | Singamsetti |
| 9,400,593 | B2 | 7/2016 | Hariton |
| 9,792,584 | B2 | 10/2017 | Hariton |
| 2011/0018903 | A1 | 1/2011 | Lapstun |
| 2011/0292076 | A1* | 12/2011 | Wither .............. G06F 17/30265 345/632 |
| 2012/0001938 | A1* | 1/2012 | Sandberg ................ H04W 4/21 345/633 |
| 2012/0075430 | A1 | 3/2012 | Ito |
| 2012/0077584 | A1* | 3/2012 | Sarmenta ................ A63F 13/69 463/31 |
| 2012/0113223 | A1 | 5/2012 | Hilliges |
| 2012/0122570 | A1 | 5/2012 | Baronoff |
| 2013/0083173 | A1 | 4/2013 | Geisner |
| 2013/0201215 | A1 | 8/2013 | Martellaro |
| 2013/0278635 | A1 | 10/2013 | Maggiore |
| 2013/0326364 | A1 | 12/2013 | Latta |
| 2013/0342572 | A1 | 12/2013 | Poulos |
| 2014/0035901 | A1 | 2/2014 | Chen |
| 2014/0091984 | A1 | 4/2014 | Ashbrook |
| 2015/0050994 | A1* | 2/2015 | Mangold .............. A63F 13/213 463/31 |
| 2015/0235423 | A1 | 8/2015 | Tobita |
| 2015/0356781 | A1 | 12/2015 | Miller |
| 2016/0110922 | A1 | 4/2016 | Haring |
| 2016/0203586 | A1 | 7/2016 | Chang |
| 2016/0210780 | A1 | 7/2016 | Paulovich |
| 2016/0314716 | A1 | 10/2016 | Grubbs |
| 2017/0092002 | A1 | 3/2017 | Mullins |
| 2017/0337858 | A1 | 11/2017 | Vartanian |
| 2018/0018825 | A1* | 1/2018 | Kim .................. G02B 27/0093 |

OTHER PUBLICATIONS

Mindshow promotional video, Mindshow Official Trailer—Create Animated Movies in Virtual Reality, YouTube, Published Apr. 14, 2017 [retrieved Sep. 18, 2017] retrieved from the Internet https://www.youtube.com/watch?v=UCVwx_vNe8U, and https://www.youtube.com/watch?v=2p9Cx4iX47E (4 pages).

Caroly Giardina, New Venture Aims to Creat AI-Driven Digital "Copies" of Hollywood Stars; published Jun. 28, 2017; [retrieved Sep. 18, 2017] retrieved from the Internet http://www.hollywoodreporter.com/behind-screen/new-venture-aims-create-ai-driven-digital-copies-hollywood-stars-1017298 (2 pages).

Mashalkar, et al., Personalized Animatable Avatars from Depth Data, Joint Virtual Reality Conference of EGVE—EuroVR (2013), [retrieved Sep. 18, 2017] retrieved from the internet https://www.cse.iitb.ac.in/~paragc/pubs/papers/paper_jvrc2013.pdf (8 pages).

Rekimoto, et al., CyberCode: Designing Augmented Reality Environments with Visual Tags, Interaction Laboratory, Sony Computer Science Laboratories, Inc. Mar. 14, 2013, retrieved from the Internet http://citeseerx.ist.psu.edu/viewdoc/download?doi=10.1.1.37.126&rep=rep1&type=pdf (10 pages).

David Kariuki, 7 firms with face tracking tech for better VR avatars, Hypergrid Business; Nov. 20, 2016, retrieved from the internet http://www.hypergridbusiness.com/2016/11/ai-emotion-and-facial-tracking-to-help-make-vr-avatars-more-realistic/ (16 pages).

Josh Constine, Augmented Reality for Trying on Makeup Is a Booming Business Posted Jan 19, 2016 by Josh Constine (@joshconstine)—TechCrunch, retrieved from the Internet https://techcrunch.com/2016/01/19/facial-precognition/ (9 pages).

Mindshow Webpage, About | Mindshow, [retrieved Sep. 18, 2017] retrieved from the Internet https://mindshow.com/about/ (6 pages).

Mindshow Webpage, How it Works, [retrieved Sep. 18, 2017] retrieved from the Internet https://mindshow.com/#how-it-works (4 pages).

Woodrow Barfield, Fundamentals of Wearable Computers and Augmented Reality, Second Edition (p. ix). CRC Press. Kindle Edition. Chapel Hill, North Carolina, Jul. 29, 2015, (pp. 59, 60, 195, 196, 227).

Neal Stephenson, Snow Crash; New York : Del Rey, 1992, (pp. 44-50, 66, 70, 76, 79, 562, and 563).

\* cited by examiner

SYSTEMS AND METHODS FOR RENDERING A VIRTUAL CONTENT OBJECT IN AN AUGMENTED REALITY ENVIRONMENT

FIELD OF THE INVENTION

The systems and methods described herein relate to presenting virtual content in an augmented reality environment.

BACKGROUND

Augmented reality environments may be used to present virtual content to users as if it were present in the real world.

SUMMARY

The systems and methods described herein may facilitate the rendering of a virtual content object in an augmented reality environment based on a physical marker. An augmented reality environment may include views of images forming virtual content superimposed over views of the real world. The virtual content may comprise objects, surfaces, textures, effects, and/or other content visibly manifested in views of the augmented reality environment. In various implementations, the virtual content may comprise virtual content objects. Virtual content objects are three-dimensional virtual images of objects, such as three-dimensional virtual images of constructed objects. For example, the objects may comprise buildings, houses, historical buildings, machines, monuments, vehicles, art installations, components of larger objects, components of a game, and/or other three-dimensional objects. In various implementations, the objects may represent objects that may or may not exist in the real-world. For example, a virtual content object comprising a house may comprise a house in the real-world or a planned house not yet built in the real-world. Virtual content objects may be rendered by a display device in an augmented reality environment based on the field of view seen through the display device and a position of a marker (and one or more linkage points associated with the marker) in the real world. When rendered in the augmented reality environment, the virtual content objects may be visualized from any angle, from the exterior or interior of the object, and manipulated in response to user input. Virtual content objects and/or user visualizations of virtual content objects may be shared with other users (local and/or remote), enabling multiple users to potentially build, modify, and/or interact with a virtual content object simultaneously and/or cooperatively.

In various implementations, the system described herein may be configured to render a virtual content object in an augmented reality environment based on a physical marker, in accordance with one or more implementations. The system may include one or more of an interface, one or more physical processors, electronic storage, a display device, a marker, and/or other components. A sign post may be configured to serve as the aforementioned marker for the virtual content object in an augmented reality environment.

The one or more physical processors may be configured by computer-readable instructions. Executing the computer-readable instructions may cause the one or more physical processors to render a virtual content object in an augmented reality environment based on a physical marker. The computer-readable instructions may include one or more computer program components. The computer program components may include one or more of a user interface component, a content management component, an image generation component, a display control component, a remote interaction component, and/or other computer program components. The one or more physical processors may be physically located within a user device and/or within any of the other components of the system. For example, the user device may comprise the display device and/or be communicatively coupled to the display device. The one or more physical processors may represent processing functionality of multiple components of the system operating in coordination. Therefore, the various processing functionality described in relation to the one or more processors may be performed by a single component or by multiple components of the system.

The user interface component may be configured to obtain an indication of the virtual content accessible to a system. For example, the virtual content accessible to a system may comprise virtual content stored on a user device, on a display device, on a marker, or otherwise stored in electronic storage, or virtual content available via a network (e.g., obtainable via the Internet, stored in cloud storage, or otherwise available via a network). A list of the available virtual content (i.e., virtual content accessible to the system) may be displayed to the user. For example, a list of the available virtual content may be displayed via a graphical user interface of a user device, a display of a display device, or any other display interface provided via a user device and/or other component of the system. In various implementations, the list of available virtual content may be selectable, enabling a user to select virtual content to be presented via the display device.

The user interface component may be configured to receive requests to modify a virtual content object. For example, the requests may comprise a request to modify one or more parameters of a virtual content object. The parameters may define a position of the virtual content when displayed in an augmented reality environment (e.g., a physical location in the real-world associated with the virtual content object, a position in relation to one or more linkage points, and/or a position in relation to one or more other virtual content objects), a size of the virtual content object, an orientation of the virtual content object with respect to a reference frame of the virtual content object, one or more colors of the virtual content object, a shape of the virtual content object, one or more haptic features of the virtual content object, one or more sounds associated with the virtual content object, one or more animations associated with the virtual content object, and/or one or more other parameters that may define how a virtual content object is rendered in an augmented reality environment. The requests may be received through various forms of user input. For example, the user input may comprise physical input, voice input, gesture-based input, input based on movement of the display device, input based on user eye movement, and/or other types of user input. The requests to modify the virtual content object may comprise design alterations, alterations to one or more dimensions of the virtual content object, the effectuation of one or more virtual repairs, and/or one or more requests to modify a virtual content object. When implemented, modifications may be defined by the one or more parameters of the virtual content object.

The content management component may be configured to manage content available to be presented in an augmented reality environment. For example, content management component may be configured to download, generate, upload, modify, remove, store, and/or otherwise manage information stored and/or accessible by the system. The information may include virtual content information. Virtual content information may define virtual content, a reference frame of the virtual content, and/or a correlation between linkage points associated with a marker and the reference frame of the virtual content. The linkage points associated with a marker may serve as an anchor for the reference frame of virtual content. As such, the position of the linkage points in the real world may define the reference frame of virtual content with respect to the real world.

The content management component may be configured to obtain virtual content information. For example, the content management component may be configured to obtain virtual content information from electronic storage and/or via a network (e.g., by downloading the content from the Internet, from cloud storage, or otherwise obtaining the virtual content information via a network). In some implementations, the content management component may be configured to determine whether virtual content information defining selected virtual content is locally stored or available and download the required virtual content information based on a determination that the virtual content information is not locally stored or available.

The content management component may be configured to generate virtual content information. Virtual content information may be initially generated using one or more techniques for generating three-dimensional content. In various implementations, virtual content information defining virtual content objects may be generated based on user input identifying one or more parameters. Therefore, the virtual content information may include information indicating the one or more parameters in order to define the virtual content object. In some implementations, virtual content information defining virtual content objects may be generated using three-dimensional animation techniques, using three-dimensional drawings (e.g., using computer-aided design (CAD) software), based on three-dimensional photography of real-world objects, based on still images and/or videos captured with a three-dimensional camera, and/or using other techniques for generating three-dimensional content. The virtual content information may be generated automatically and/or based on user input related to the one or more techniques for generating three-dimensional content. The content management component may be configured to generate modified virtual content information based on input received via a device of a user (e.g., user input indicating a request to modify a parameter of a virtual content object). The content management component may be configured to generate and/or modify virtual content information based on user input in real-time.

Virtual content information maintained by content management component may be accessible to other users, enabling virtual content created, modified, and/or obtained by a user to be shared with other users. The content management component may be configured to establish one or more access controls associated with virtual content information. Different access controls may be established for different virtual content information. Access controls may restrict users to accessing, downloading, uploading, modifying, storing, removing, and/or otherwise interacting with virtual content information. For example, a virtual content object may be restricted such that it is only viewable in association with one or more linkage points at one or more predefined physical locations.

The image generation component may be configured to generate an image of virtual content to be displayed in an augmented reality environment. In various implementations, the image generation component may be configured to generate an image of virtual content to be displayed in an augmented reality environment based at least on a user's field of view and virtual content information (i.e., information defining at least the virtual content and a reference frame of the virtual content).

A user's field of view may be defined based on orientation information, location information, and/or other information. The orientation information may define an orientation of the display device. For example, the orientation of display device may be defined by one or more of a pitch angle, a roll angle, a yaw angle, and/or other measurements. When looking through the display device, the orientation of display device may indicate the direction of a user's gaze. The location information may identify a physical location of the display device. By determining the direction of a user's gaze and the user's physical position in the real world, a user's field of view may be determined.

The image generation component may be configured to generate an image of virtual content to be displayed in an augmented reality environment based further on the correlation between linkage points associated with a physical marker and a reference frame of the virtual content. The image generation component may be configured to identify linkage points associated with a marker and visible within a field of view of a user via a display device. The linkage points associated with the physical marker may be defined with respect to the physical marker and may serve as an anchor for the reference frame of the virtual content. As such, when rendered in an augmented reality environment by the display device, the virtual content may appear within a user's field of view based on how the reference frame of the virtual content is correlated to the real world by virtue of the position of the linkage points in the real world.

The image generation component may be configured to automatically generate images of the virtual content as a user's field of view changes, thus changing the depiction of the virtual content in the augmented reality environment based on the reference frame of the virtual content and its correlation to the position of the linkage points. The image generation component may be configured to generate exterior and interior views of virtual content objects based on a position of a user with respect to the reference frame of the virtual content object. In some implementations, the size of the image of a virtual content object in the augmented reality environment may be the same as, similar to, or proportionate to the size of the object depicted by the virtual content object as it appears, or would appear, in the real world. Thus, in some implementations, the image generation component may be configured to depict virtual content objects in an augmented reality environment as they appear, or would appear, in the real world, enabling users to perceive and interact with (e.g., walk through) the virtual content objects as they exist or would exist in the real world. In some implementations, the image of a virtual content object may appear much larger or much smaller in the augmented reality environment than how the object depicted by the virtual content object appears, or would appear, in the real world. In other words, a virtual content object depicting a particular object may be depicted in the augmented reality environment at any size that is suitable and/or desirable for viewing the object in the augmented reality environment.

For example, a user may be able to visualize the exterior and interior of a virtual content object depicting a car or house as the user moves with respect to the image of the virtual content object. As a result, a user may build a car by choosing one or more options or design a house by selecting and/or manipulating one or more design features, and visualize the car or house from multiple angles or from the exterior or interior, all within in an augmented reality environment. For virtual content objects depicting a historical building or a historical monument, the image generation component may be configured to automatically generate images of the virtual content as a user's field of view changes, thus enabling a user to visualize a historical building such as the Pantheon or a historical monument such as Stonehenge from multiple angles or from the exterior or interior, all within in an augmented reality environment.

The display control component may be configured to cause an image generated by image generation component to be displayed in an augmented reality environment via a display device. The display control component may be configured to effectuate transmission of instructions to the display device to cause the image to be displayed. Images of virtual content generated by image generation component may be presented via a display device in conjunction with the real world so that the virtual content appears as if it exists in the real world. The display control component may be configured to cause updated and/or modified images of virtual content objects to be displayed in the augmented reality environment via a display device in real-time.

The remote interaction component may be configured to facilitate numerous types of remote interaction with a virtual content object. In various implementations, a single virtual content object may be viewed at the same or a different time at two different locations and/or by two different users via one or more display devices. The remote interaction component may be configured to manage the modification of a virtual content object by multiple users. In some implementations, multiple users may simultaneously view duplicate virtual content objects defined based on a single set of virtual content information and modifications made by any user viewing the duplicate virtual content objects may cause modified virtual content information defining a new virtual content object to be generated, irrespective of actions taken by any other user.

The remote interaction component may be configured to facilitate multiple users cooperatively modifying a virtual content object. Cooperative modification of a virtual content object may be based on access controls and/or one or more other rules for modifying the virtual content object. For example, cooperative modification may be limited to one input at a time from the one or more users, users may be required to alternate or take turns between modifications (sequential), conflicting modifications in substance or time may be cancelled or ignored, modifications may be based on a hierarchy defining a priority order between the one or more users, and/or based on one or more other rules for cooperatively modifying virtual content objects. In some implementations, the access controls may specify an administrative user. Each modification made may be subject to approval by the administrative user. In some implementations, any non-conflicting modifications made may be implemented and all conflicting modifications may be subject to the one or more access controls. For example, each conflicting modification may be subject to approval or input by one or more administrative users. In some implementations, all modifications may be subject to approval or input by one or more administrative users. In various implementations, remote interaction component may be configured to prompt an administrative user to determine whether or not a requested modification is approved.

The remote interaction component may be configured to facilitate the broadcast of a visualization of an augmented reality environment by a user via a display device to one or more other users viewing the broadcast via one or more other display devices. For example, a recording of images rendered in an augmented reality environment via a display device may be transmitted to one or more user devices associated with other users. In some implementations, the remote interaction component may be configured to facilitate a live stream of an augmented reality environment viewed via a display device to one or more other user devices. As such, a remote user may be able to view an augmented reality environment another user is viewing via display device in real-time.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

This disclosure relates to systems and methods for rendering a virtual content object in an augmented reality environment based on a physical marker, in accordance with one or more implementations. Virtual content objects are three-dimensional virtual images of objects, such as three-dimensional virtual images of constructed objects. For example, the objects may comprise buildings, houses, historical buildings, machines, monuments, vehicles, art installations, components of larger objects, components of a game, and/or other three-dimensional objects. In various implementations, the objects may represent objects that may or may not exist in the real-world. For example, a virtual content object comprising a house may comprise a house in the real-world or a planned house not yet built in the real-world. Virtual content objects may be rendered by a display device in an augmented reality environment based on the field of view seen through the display device and a position of a marker (and one or more linkage points associated with the marker) in the real world. When rendered in the augmented reality environment, the virtual content objects may be visualized from any angle, from the exterior or interior of the object, and manipulated in response to user input. Virtual content objects and/or user visualizations of virtual content objects may be shared with other users (local and/or remote), enabling multiple users to potentially build, modify, and/or interact with a virtual content object simultaneously and/or cooperatively.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

Figure 1:
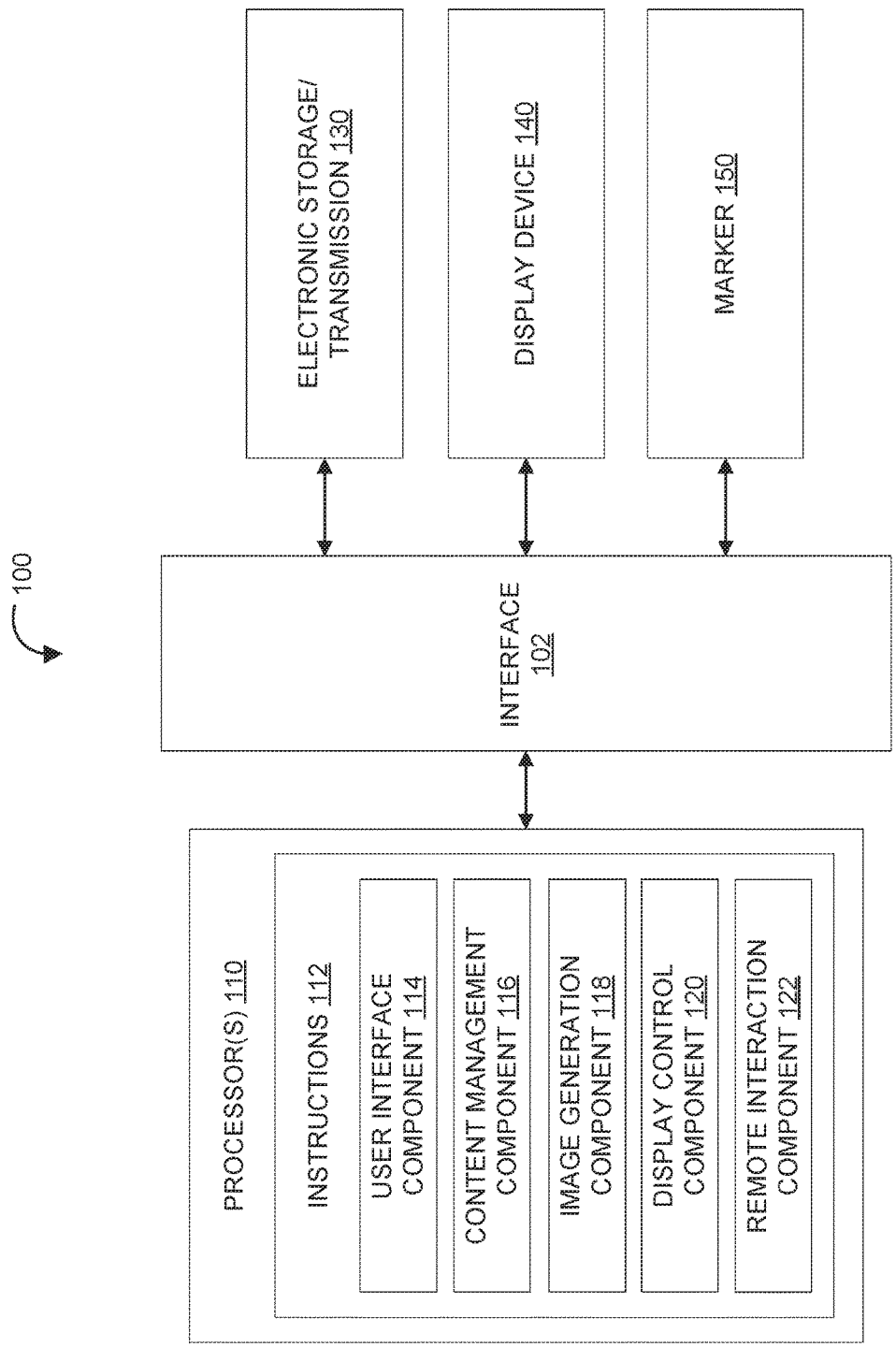
FIG. 1 illustrates a system for rendering a virtual content object in an augmented reality environment based on a physical marker, in accordance with one or more implementations.

FIG. 1 illustrates a system 100 for rendering a virtual content object in an augmented reality environment based on a physical marker, in accordance with one or more implementations. The system may include one or more of interface 102, one or more physical processors 110, electronic storage 130, display device 140, marker 150, and/or other components.

The one or more physical processors 110 (also interchangeably referred to herein as processor(s) 110, processor 110, or processors 110 for convenience) may be configured to provide information processing capabilities in system 100. As such, the processor(s) 110 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

Processor(s) 110 may be configured to execute one or more computer readable instructions 112. Computer readable instructions 112 may include one or more computer program components. Computer readable instructions 112 may include one or more of user interface component 114, content management component 116, image generation component 118, display control component 120, remote interaction component 122, and/or other computer program components. As used herein, for convenience, the various computer readable instructions 112 will be described as performing an operation, when, in fact, the various instructions program the processor(s) 110 (and therefore system 100) to perform the operation.

User interface component 114 may be configured to generate and cause a user interface to be displayed to a user. In various implementations, the user interface may be displayed to a user via a display interface of a user device. For example, a user interface may be displayed to a user via a graphical user interface of a user device, a display of display device 140, or any other display interface provided via a user device and/or a component of system 100.

In various implementations, user interface component 114 may be configured to generate a user interface that provides a user with information related to system 100 without enabling the user to provide input via the user interface. For example, the information related to the system may comprise an indication of one or more connected devices (e.g., a user device such as a smartphone or display device, one or more markers, and/or other devices connectable to system 100), sets of virtual content depicted in the augmented reality environment whether currently visible or not, sets of virtual content available to be presented via display device 140 (e.g., content available via one or more devices of a user, electronic storage 130, marker 150, and/or other components of system 100), an indication of a direction in which virtual content may be visible via a display of display device 140, an indication of one or more markers visible via a display of display device 140, an indication of one or more other users interacting with and/or viewing a set of virtual content, a current time and/or date, and/or other information related to system 100.

In various implementations, user interface component 114 may be configured to generate a user interface that provides a user with information related to system 100 and enables a user to provide input. For example, the user interface may comprise selectable icons, input fields, and/or other user input options enabling a user to control one or more aspects of system 100. In various implementations, user interface component 114 may be configured to generate a user interface that enables a user to modify virtual content information for virtual content (e.g., a virtual content object) based on one or more types of user input. For example, a user interface generated by user interface component 114 may be configured to receive requests to modify a virtual content object displayed via display device 140. In some implementations, user interface component 114 may be configured to generate and provide to a user an interface that may receive requests to modify virtual content while the virtual content is simultaneously being displayed via display device 140. The requests to modify the virtual content object may comprise design alterations, alterations to one or more dimensions of the virtual content object, the effectuation of one or more virtual repairs, and/or one or more requests to modify a virtual content object. When implemented, modifications may be defined by the one or more parameters of the virtual content object.

In some implementations, user interface component 114 may be configured to generate a user interface that presents selectable options to modify virtual content. For example, user interface component 114 may be configured to present a list of predefined options to modify one or more parameters of virtual content, one or more components of a virtual content object, and/or one or more other aspects of virtual content. In other words, a request to modify may in some implementations comprise a selection of one or more options associated with a virtual content object. In an exemplary implementation in which a virtual content object comprises an automobile, user interface component 114 may be configured to present an interface comprising a selectable list of available options associated with that particular automobile depicting by the virtual content object.

In various implementations, user interface component 114 may be configured to generate a user interface that provides an indication of the virtual content available to be presented via display device 140. Virtual content may comprise one or more virtual content items depicted in an augmented reality environment based on one or more reference frames. An augmented reality environment may comprise a space that represents a virtual environment that may be superimposed over a perspective of a physical real-world environment around a user. An augmented reality environment may include attributes of a virtual environment, including virtual content superimposed over portions of the physical environment. In some implementations, an augmented reality environment may represent physical objects in the physical world as virtual content in the augmented environment.

A virtual content item may refer to an object, a part of an object, a surface, a texture, an effect, and/or other items visibly manifested in views of the augmented reality environment. For example, in various implementations, a virtual content item may comprise a virtual content object. Virtual content objects are three-dimensional virtual images of constructed, built, or manufactured objects. For example, the objects may comprise buildings, houses, historical buildings, machines, monuments, vehicles, art installations, books, components of larger objects, components of a game, and/or other three-dimensional objects. In some implementations, a virtual content object may comprise a three-dimensional virtual image of a nano construction or a graphine mesh. In various implementations, the objects may represent objects that may or may not exist in the real-world. For example, a virtual content object comprising a house may comprise a house in the real-world or a planned house not yet built in the real-world. As such, the virtual content object may represent drawings of or plans for an object that does not exist in the real-world. In some implementations, three-dimensional images of virtual content objects may comprise still images, interactive images, images that change based on the field of view and position of a user visualizing the images, simulations of virtual content objects, and/or other three-dimensional images. A set of virtual content refers to a virtual content item or virtual content items that share a reference frame. That is, the position, orientation, scale, and/or other parameters of the virtual content item or items in the set of virtual content can be manipulated in a coordinated way by manipulating the reference frame for the set of virtual content.

At times, a view of the augmented reality environment may include virtual content items from multiple sets of virtual content. A given set of virtual content may be depicted in the augmented reality environment in accordance with the corresponding reference frames. That means a first set of virtual content present in a view of the augmented reality environment may correspond to a first reference frame that is separate and/or independent from a second reference frame that corresponds to a second set of virtual content. In some implementations, some of the sets of virtual content may have a hierarchical structure in which multiple sets of virtual content are included within a set of virtual content that is "higher" in the hierarchy with a corresponding reference frame. For example, the first set of virtual content and the second set of virtual content may both be included within a third set of virtual content that corresponds to a third reference frame. This hierarchy may enable the position, orientation, scale, and/or other parameters of the first set of virtual content and/or the second set of virtual content to be manipulated separately and/or independently from each (e.g., via the first reference frame and/or the second reference frame), and/or manipulated together by manipulating the third reference frame.

The virtual content available to be presented via display device 140 may include virtual content stored on or accessible via one or more devices of a user, electronic storage 130, marker 150, and/or other components of system 100. In some implementations, user interface component 114 may be configured to provide a list of virtual content available to be presented via display device 140 obtained from content management component 116. For example, user interface component 114 may be configured to cause a selectable list of virtual content objects available to be presented via display device 140 to be provided to a user. The list of virtual content available to be presented via display device 140 may include virtual content stored on or accessible via one or more devices of a user, electronic storage 130, marker 150, and/or other components of system 100, and/or virtual content available via a network (e.g., obtainable via the Internet, stored in cloud storage, or otherwise available via a network). In some implementations, user interface component 114 may be configured to cause a selectable list of virtual content objects to be provided to a user via a user interface. In some implementations, user interface component 114 may be configured to receive a selection indicating virtual content to be presented via display device 140. For example, user interface component 114 may be configured to receive user input indicating a selection of one or more virtual content objects to be presented via display device 140.

In some implementations, user interface component 114 may be configured to generate a user interface that provides one or more selectable controls associated with recording, broadcasting, live streaming, and/or otherwise providing an image of an augmented reality environment to one or more other users. For example, the one or more selectable controls may enable a user to pause, stop, fast forward, rewind, and/or otherwise control a recording. In some implementations, the one or more selectable controls may enable a user to identify one or more recipients of an image of an augmented reality environment and/or establish one or more access controls associated with the image of the augmented reality environment.

Content management component 116 may be configured to manage virtual content to be rendered in an augmented reality environment. In various implementations, content management component 116 may be configured to download, upload, modify, remove, and/or otherwise manage information stored and/or accessible by system 100. Information stored and/or accessible by system 100 may include virtual content information. Virtual content information may define virtual content (or a set of virtual content), a reference frame of the virtual content, and/or a correlation between linkage points associated with a marker and the reference frame of the virtual content. The linkage points may comprise indicators, transponders, stitching points, and/or other identified points on a marker (i.e., marker 150). The linkage points associated with a marker may serve as an anchor for the reference frame of virtual content. As such, the position of the linkage points in the real world may define the reference frame of virtual content with respect to the real world.

In various implementations, virtual content information may comprise multiple parameters that define a virtual content object to be displayed in an augmented reality environment. For example, the parameters may define a position of the virtual content when displayed in an augmented reality environment (e.g., a physical location in the real-world associated with the virtual content object, a position in relation to one or more linkage points, and/or a position in relation to one or more other virtual content objects), a size of the virtual content object, an orientation of the virtual content object with respect to a reference frame of the virtual content object, one or more colors of the virtual content object, a shape of the virtual content object, one or more haptic features of the virtual content object, one or more sounds associated with the virtual content object, and/or one or more other parameters that may define how a virtual content object is rendered in an augmented reality environment. For example, parameters defining one or more animations associated with a virtual content object may define the nature and timing of an animation associated with the virtual content object. In an exemplary implementation, a virtual content object depicting a car may be associated with one or more animations that show a door of the car opening and closing. In another exemplary implementation, a virtual content object depicting a windmill may be associated with one or more animations that show a blade of the windmill spinning.

Virtual content information defining virtual content may be generated using various techniques. Virtual content information may be initially generated using one or more techniques for generating three-dimensional content. In various implementations, virtual content information defining virtual content objects may be generated based on user input identifying one or more parameters. Therefore, the virtual content information may include information indicating the one or more parameters in order to define a virtual content object. In some implementations, virtual content information defining virtual content objects may be generated using three-dimensional animation techniques, using three-dimensional drawings (e.g., using computer-aided design (CAD) software), based on three-dimensional photography of real-world objects, based on still images and/or videos captured with a three-dimensional camera, and/or using other techniques for generating three-dimensional content. The virtual content information may be generated automatically and/or based on user input related to the one or more techniques for generating three-dimensional content. In various implementations, virtual content information may be generated, modified, and/or otherwise produced in real-time based on user input.

In various implementations, virtual content may be generated based on a template. A template may comprise a standardized framework upon which virtual content objects may be generated. In other words, a template may comprise a foundation upon which virtual content objects may be constructed. For example, virtual content objects may be constructed using a template and one or more techniques for generating three-dimensional content. A template may be associated with one or more predefined parameters. For example, the predefined parameters may define a predefined reference frame that is correlated to linkage points associated with one or more markers (e.g., marker 150). In various implementations, the virtual content information defining a virtual content object comprises information identifying one or more predefined parameters of a template associated with the virtual content object. In some implementations, a template may be used to associate virtual content constructed based on the template with any set of linkage points associated with any marker (e.g., marker 150). For example, a template may be configured to automatically associate with one or more linkage points of a marker (e.g., marker 150) to establish a reference frame for virtual content constructed based on the template, regardless of the specific content itself. In some implementations, a template may be associated with one or more predefined sets of one or more linkage points of one or more markers.

In various implementations, a template may be obtained (e.g., downloaded, received, and/or otherwise obtained) and provided to a creator of content. In some implementations, content management component 116 may be configured to cause a template to be provided to a user device associated with a user. For example, content management component 116 may be configured to obtain a template from electronic storage, download a template from the Internet and/or cloud storage, and/or otherwise obtain a template and cause the template to be transmitted and/or provided to a user device associated with a user. In some implementations, content management component 116 may be configured to obtain a template responsive to and based on a request from a user. In some implementations, a request from a user for a template may indicate one or more predefined parameters associated with the requested template. For example, the request from the user may indicate that a template associated with one or more particular markers (e.g., marker 150) is requested and/or that a template associated with a particular reference frame is requested.

In various implementations, content management component 116 may be configured to obtain virtual content information. For example, content management component 116 may be configured to obtain virtual content information from electronic storage. In some implementations, content management component 116 may be configured to obtain virtual content information stored at one or more devices of user. In some implementations, content management component 116 may be configured to obtain virtual content information via a network (e.g., obtainable via the Internet, stored in cloud storage, or otherwise available via a network). For example, content management component 116 may be configured to download virtual content information from the Internet or from cloud storage in response to a selection of virtual content to be displayed on display device 140.

In some implementations, content management component 116 may be configured to obtain virtual content information from marker 150. For example, in some implementations, marker 150 may comprise a wirelessly connectable device linked to a power source and electronic storage. In some implementations, content management component 116 may be configured obtain virtual content information from a sign post serving as marker 150 as described in co-pending U.S. patent application Ser. No. 15/707,854, entitled "SYSTEMS AND METHODS FOR UTILIZING A DEVICE AS A MARKER FOR AUGMENTED REALITY CONTENT,", the disclosure of which is hereby incorporated by reference in its entirety herein.

In some implementations, content management component 116 may be configured to obtain and/or maintain a list of virtual content available to be presented via display device 140. For example, the list of virtual content available to be presented via display device 140 may include virtual content stored on or accessible via one or more devices of a user, electronic storage 130, marker 150, and/or other components of system 100. Content management component 116 may be configured to provide the list of virtual content available to be presented via display device 140 to user interface component 114.

In some implementations, content management component 116 may be configured to determine whether virtual content information defining selected virtual content is locally stored or available via a device of a user, electronic storage 130, marker 150, and/or other components of system 100. Based on a determination that the virtual content information is not available via a device of a user, electronic storage 130, marker 150, or other component of system 100, content management component 116 may be configured to download virtual content information from the Internet or from cloud storage based. For example, content management component 116 may be configured to automatically download virtual content information based on a determination that the virtual content information is not available via a device of a user, electronic storage 130, marker 150, or other component of system 100.

In various implementations, content management component 116 may be configured to generate virtual content information. For example, content management component 116 may be configured to generate virtual content information by modifying virtual content information defining a virtual content object. In some implementations, content management component 116 may be configured to generate modified virtual content information based on input received via a device of a user. For example, a user device, display device 140, and/or other components of system 100 may be configured to receive user input. In various implementations, the user input may comprise a request to modify a virtual content object. User input may comprise physical input, voice input, gesture-based input, input based on movement of the display device, input based on user eye movement, and/or other types of user input. In some implementations, the user input may be received via a user device (e.g., via a user interface provided by user interface component 114), display device 140, and/or other device connected to system 100. In some implementations, the user input may be provided to system 100 via a user device, display device 140, marker 150, and/or other device connected to system 100. User input may comprise a request to modify one or more parameters of the multiple parameters defining the virtual content object. In various implementations, content management component 116 may be configured to generate and/or modify virtual content information based on user input in real-time.

In various implementations, content management component 116 may be configured to store virtual content information. For example, content management component 116 may be configured to store virtual content information at one or more devices of a user, electronic storage 130, marker 150, and/or other storage component accessible by system 100. For example, content management component 116 may be configured to store virtual content information in cloud storage. In some implementations, content management component 116 may be configured to automatically store generated and/or modified virtual content information. For example, content management component 116 may be configured to generate virtual content information based on a request to modify a virtual content object and automatically store the generated virtual content information based on the modification request in electronic storage. In some implementations, content management component 116 may be configured to store virtual content information in electronic storage based on receipt of an indication from a user to store the virtual content information.

Virtual content information maintained by content management component 116 may be accessible to other users, enabling virtual content created, modified, and/or obtained by a user to be shared with other users. In various implementations, virtual content information may include an identification of one or more locations associated with a virtual content object. For example, a location associated with a virtual content object may be a physical location and/or a virtual location. A user may define a physical location based on GPS coordinates, an address, a relative position with respect to one or more identified locations, and/or other information of which to associate a virtual content object. A user may define a virtual location based on a corresponding physical location in the real world. For example, a remote user viewing an augmented reality environment may visualize a virtual content object in association with a remote physical location. In some implementations, a virtual content object may be restricted such that it is only viewable in association with one or more linkage points at one or more predefined locations.

In various implementations, content management component 116 may be configured to identify one or more users to which virtual content information is to be made accessible. In some implementations, content management component 116 may be configured to obtain an indication of one or more users from a user via a user device. For example, content management component 116 may cause virtual content information defining a virtual content object depicting a house to be shared with and/or transmitted to a builder or architect based on identification of the builder or architect by a user. In some implementations, content management component 116 may be configured to receive an indication of user input identifying one or more users to make virtual content information available. User input may identify the one or more users by providing a name of the one or more users, contact information for one or more users, and/or other information identifying one or more users. In some implementations, content management component 116 may be configured to automatically access a contact list associated with a user based on receipt of an indication of one or more users to make virtual content information available.

In some implementations, content management component 116 may be configured to identify one or more users to which virtual content information is to be made accessible based on requests to access the virtual content information received from the one or more users. When requests to access virtual content information are received from one or more users, content management component 116 may be configured to prompt a user associated with the virtual content information for approval to make the virtual content information accessible to the one or more users.

In some implementations, content management component 116 may be configured to identify one or more users to which virtual content information is to be made accessible based on geolocation information associated with the one or more users. Geolocation information may identify a geographically definable location associated with one or more users at one or more points in time. Geolocation information associated with one or more users may be obtained from a user device associated with each of the one or more users and determined automatically and/or based on user input received from the one or more users. For example, based on the geographically definable location associated with one or more users and a location associated with virtual content information, content management component 116 may be configured to make the virtual content information accessible to the one or more users.

In some implementations, content management component 116 may be configured to identify one or more users to which virtual content information is to be made accessible based on one or more predefined users associated with virtual content information. For example, virtual content information defining a car with one or more users selected options may be based on predefined virtual content information provided by a car dealer or manufacturer. Based on a prestored association of the car dealer or manufacturer with the predefined virtual content information, content management component 116 may be configured to identify the car dealer or manufacturer as a user to share the virtual content information.

In various implementations, content management component 116 may be configured to establish one or more access controls associated with virtual content information. Different access controls may be established for different virtual content information. Access controls may restrict users to accessing, downloading, uploading, modifying, storing, removing, and/or otherwise interacting with virtual content information. For example, access controls for virtual content information may comprise an indication of one or more rules for modifying the virtual content information. In various implementations, content management component 116 may be configured to access, download, upload, modify, store, remove, and/or otherwise manage information stored and/or accessible by system 100 based on one or more access controls.

Image generation component 118 may be configured to generate an image of virtual content to be displayed in an augmented reality environment. In various implementations, image generation component 118 may be configured to generate an image of virtual content to be displayed in an augmented reality environment visible via display device 140. Images of virtual content generated by image generation component 118 may be presented via a display of display device 140 in conjunction with the real world so that the virtual content appears as if it exists in the real world. In various implementations, image generation component 118 may be configured to generate an image of virtual content to be displayed in an augmented reality environment based at least on a user's field of view and virtual content information obtained via content management component 116.

In various implementations, image generation component 118 may be configured to generate an image of virtual content to be displayed in an augmented reality environment based on a user's field of view. When utilizing display device 140, a display of the display device may contain a view of the real world based on the user's field of view. A user's field of view may be defined based on orientation information, location information, and/or other information. For example, a user's field of view may be defined based at least on orientation information associated with display device 140 and location information associated with display device 140. Orientation information may define an orientation of display device 140. In some implementations, the orientation of display device 140 may refer to one or more of a pitch angle, a roll angle, a yaw angle, and/or other measurements. Orientation information may be obtained from an orientation sensor of display device 140. When looking through display device 140, the orientation of display device 140 may indicate the direction of a user's gaze. Location information may identify a physical location of display device 140. In some implementations, the physical location of display device 140 may refer to the geographic location of display device 140. Location information may identify a physical location based on GPS coordinates, an address, a relative position with respect to one or more identified locations, and/or other information. Location information may be obtained from a GPS component of a user device, display device 140, and/or other component of system 100. By determining the direction of a user's gaze and the user's physical position in the real world, a user's field of view may be determined.

In various implementations, image generation component 118 may be configured to generate an image of virtual content to be displayed in an augmented reality environment based on virtual content information obtained via content management component 116. In implementations in which the virtual content comprises a virtual content object, the image of the virtual content object may comprise a three-dimensional virtual image of the object. Virtual content information may define virtual content (or a set of virtual content), a reference frame of the virtual content, and/or a correlation between linkage points and the reference frame of the virtual content. Linkage points may be defined with respect to an object in the real world (e.g., marker 150). The linkage points may serve as an anchor for the reference frame of the virtual content. As such, when rendered in an augmented reality environment by display device 140, the virtual content may appear within a user's field of view based on how the reference frame of the virtual content is correlated to the real world by virtue of the position of the linkage points in the real world. In various implementations, image generation component 118 may be configured to identify one or more linkage points visible within a field of view of a user via display device 140.

Figure 2A:
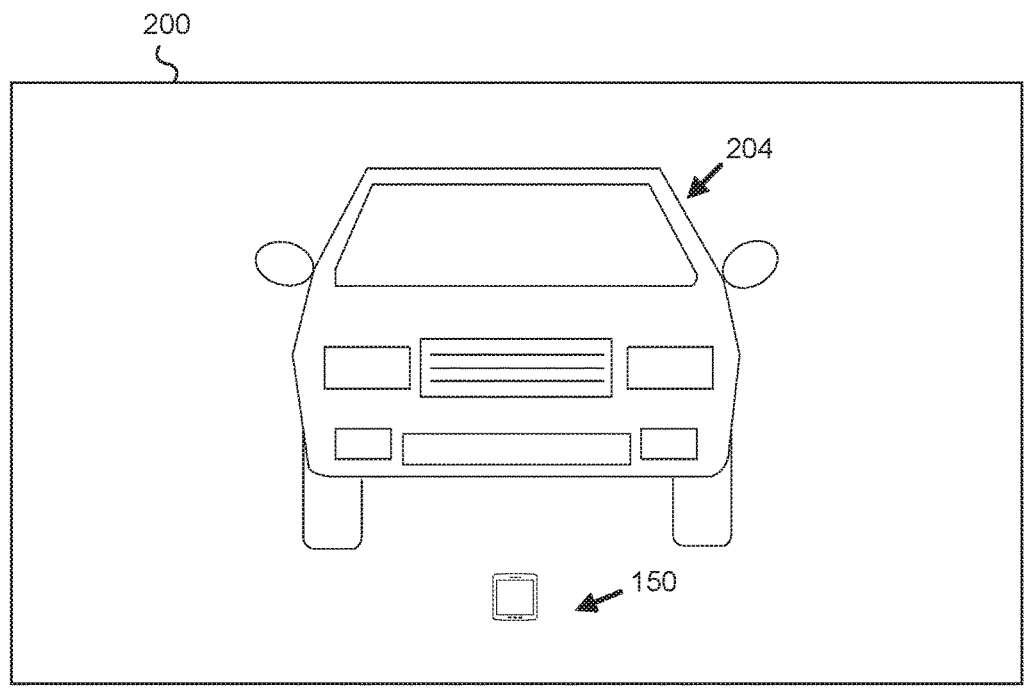
FIG. 2A and FIG. 2B illustrate exemplary displays of an augmented reality environment, in accordance with one or more implementations.

For example, and referring to FIG. 2A, exemplary display 200 of an augmented reality environment with virtual content is illustrated, in accordance with one or more implementations. Exemplary display 200 may comprise marker 150 and an image of virtual content 204. Exemplary display 200 may include virtual content 204 depicting an automobile. Marker 150 may comprise or be defined based on an association with a smart phone. Marker 150 may be associated with multiple linkage points that serve as an anchor for the reference frame of virtual content 204. In various implementations, virtual content information defining virtual content 204 and/or a correlation between the linkage points and a reference frame of virtual content 204 may be obtained from marker 150. As display device 140 moves, image generation component 118 may be configured to automatically generate a new image based on the user's current field of view. For example, and referring to FIG. 2B, exemplary display 202 of an augmented reality environment with virtual content is illustrated, in accordance with one or more implementations. As one or more users (or one or more display devices, such as display device 140) move with respect to marker 150, the images presented to each user via the user's display device (such as display device 140) may change based on the change in each user's field of view. For example, exemplary display 202 may comprise a display of the augmented reality environment depicted in exemplary display 200 after a user (or display device 140) moves 90 degrees rotationally around marker 150. As such, exemplary display 202 may comprise an image of virtual content 204 rotated 90 degrees. In various implementations, the reference frame of virtual content 204 may be anchored to the multiple linkage points of marker 150, enabling virtual content 204 to be fixed in space as one or more users (or one or more display devices, such as display device 140) move with respect to marker 150 and virtual content 204.

In various implementations, image generation component 118 may be configured to generate a new image of virtual content as a user's field of view changes. For example, display device 140 may move as a user utilizing display device 140 changes position and/or rotates display device 140. As display device 140 moves, image generation component 118 may be configured to automatically generate a new image based on the user's current field of view and virtual content information obtained via content management component 116. Therefore, image generation component 118 may be configured to generate a new image of virtual content based at least on a user's current field of view in real-time. In various implementations, image generation component 118 may be configured to obtain an indication of an updated position of display device 140 in the real world at a second time and generate an updated image of virtual content based on the updated position of the display device 140 at the second time and the user's field of view at the second time. Therefore, image generation component 118 may be configured to generate a first image of virtual content to be displayed at a first time based on the field of view of the user at the first time and generate a second image of virtual content to be displayed at a second time based on the field of view of the user at the second time.

Figure 3A:
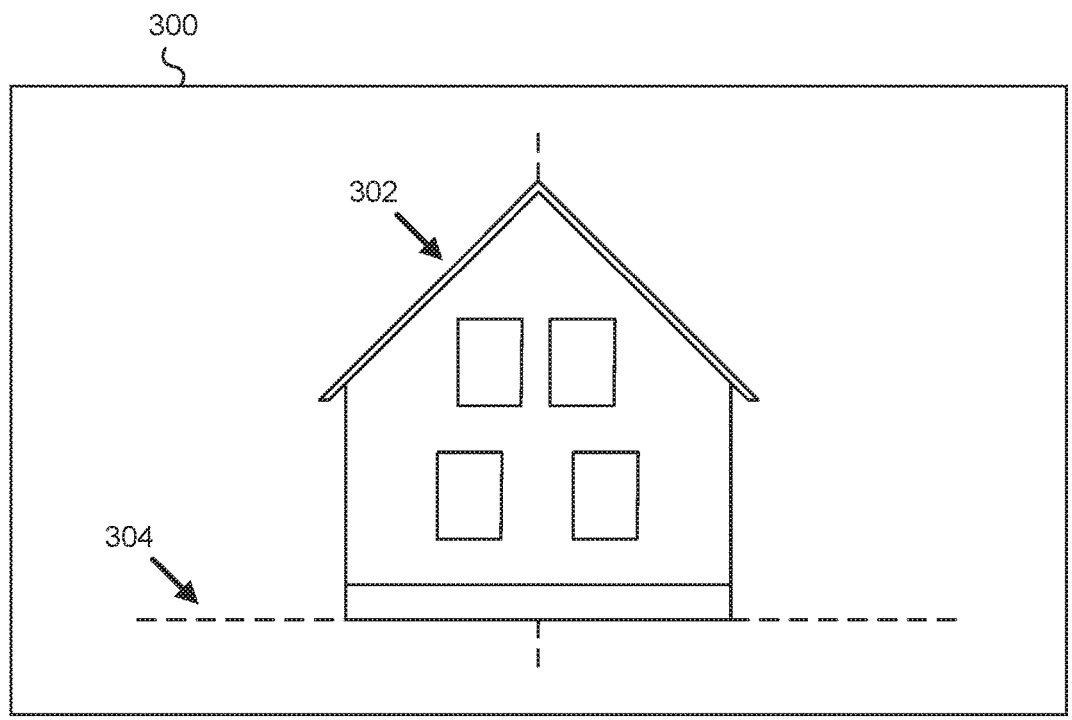
FIG. 3A and FIG. 3B illustrate exemplary displays of an augmented reality environment, in accordance with one or more implementations.
Figure 3B:
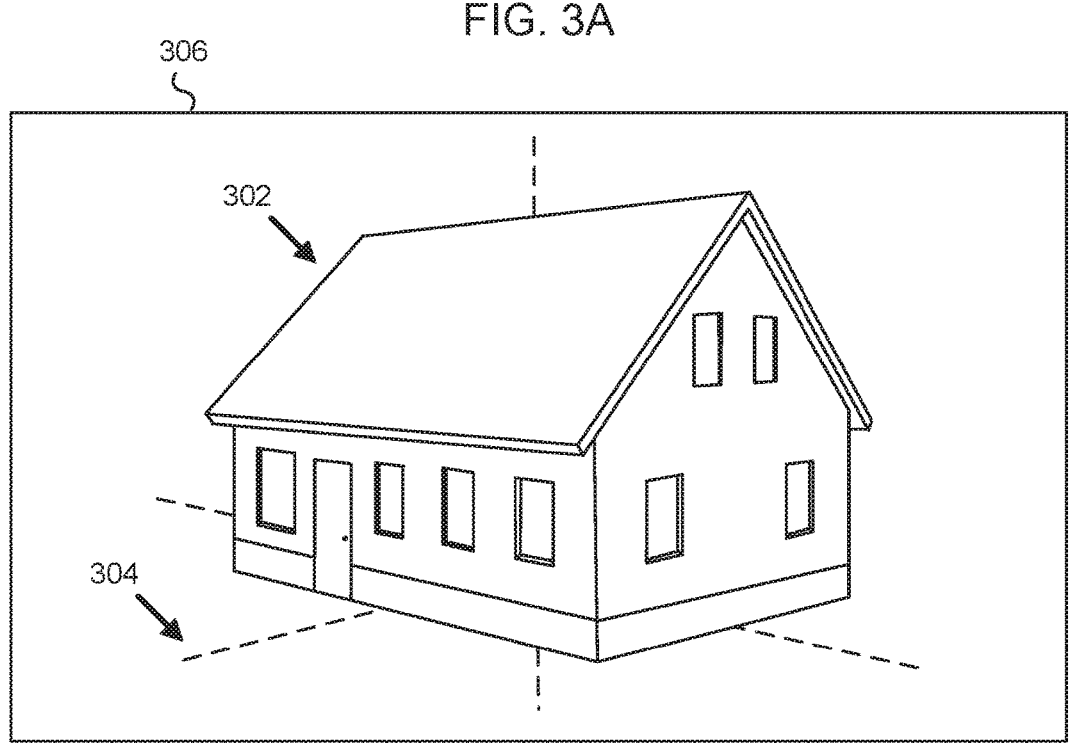

For example, and referring to FIG. 3A, exemplary display 300 of an augmented reality environment is illustrated, in accordance with one or more implementations. Exemplary display 300 may comprise an image of virtual content 302 comprising a house. Virtual content 302 may be anchored to a marker (i.e., marker 150) comprising one or more linkage points. In this exemplary embodiment, the marker (i.e., marker 150) may comprise or be defined based on a physical object such as a house or building, a smartphone, and/or some other real-world object visible within a user's field of view via display device 140. In various implementations, an image of virtual content 302 may be generated based on virtual content information defining the virtual content and a correlation between marker 150 and reference frame 304 of virtual content 302. As display device 140 moves, image generation component 118 may be configured to automatically generate a new image based on the user's current field of view. For example, and referring to FIG. 3B, exemplary display 306 of an augmented reality environment with virtual content is illustrated, in accordance with one or more implementations. As a user (or display device 140) moves with respect to marker 150 and reference frame 304, the images presented to the user via display device 140 may change based on the change in the user's field of view. For example, exemplary display 306 may comprise a display of the augmented reality environment depicted in exemplary display 300 after a user (or display device 140) moves rotationally around marker 150 and reference frame 304. As such, exemplary display 306 may comprise an image of virtual content 302 at a different vantage point (i.e., from a different angle and/or position). In various implementations, reference frame 304 may be anchored to one or more linkage points of a marker (i.e., marker 150), enabling virtual content 302 to be fixed in space as a user (or display device 140) moves with respect to marker 150, reference frame 304, and, accordingly, the image of virtual content 302.

In various implementations, image generation component 118 may be configured to generate exterior images and/or interior images of virtual content. Virtual content information may define exterior images and/or interior images of virtual content visible via display device 140 based on the position of display device 140 with respect to a reference frame of virtual content 204. In other words, as a user moves with respect to a reference frame of virtual content, image generation component 118 may be configured to generate images of the virtual content object to give the user the impression the user is walking through the virtual content object. In some implementations, the size of the image of a virtual content object in the augmented reality environment may be the same as, similar to, or proportionate to the size of the object depicted by the virtual content object as it appears, or would appear, in the real world. Thus, in some implementations, image generation component 118 may be configured to depict virtual content objects in an augmented reality environment as they appear, or would appear, in the real world, enabling users to perceive and interact with (e.g., walk through) the virtual content objects as they exist or would exist in the real world. In some implementations, the image of a virtual content object may appear much larger or much smaller in the augmented reality environment than how the object depicted by the virtual content object appears, or would appear, in the real world. In other words, a virtual content object depicting a particular object may be depicted in the augmented reality environment at any size that is suitable and/or desirable for viewing the object in the augmented reality environment. In an exemplary implementation in which a virtual content object comprises a three-dimensional virtual image of a nano construction or a graphine mesh, the virtual content object may be depicted in an augmented reality environment much larger than it appears or would appear in the real world, enabling a user to perceive and/or interact with an image of the nano construction or graphine mesh without the use of a microscope. In an exemplary implementation in which a virtual content object comprises a ship, the virtual content object may be depicted in an augmented reality environment much smaller than it appears or would appear in the real world, enabling a user to perceive and interact with multiple sides of the ship simultaneously via the image of the ship.

Figure 2B:
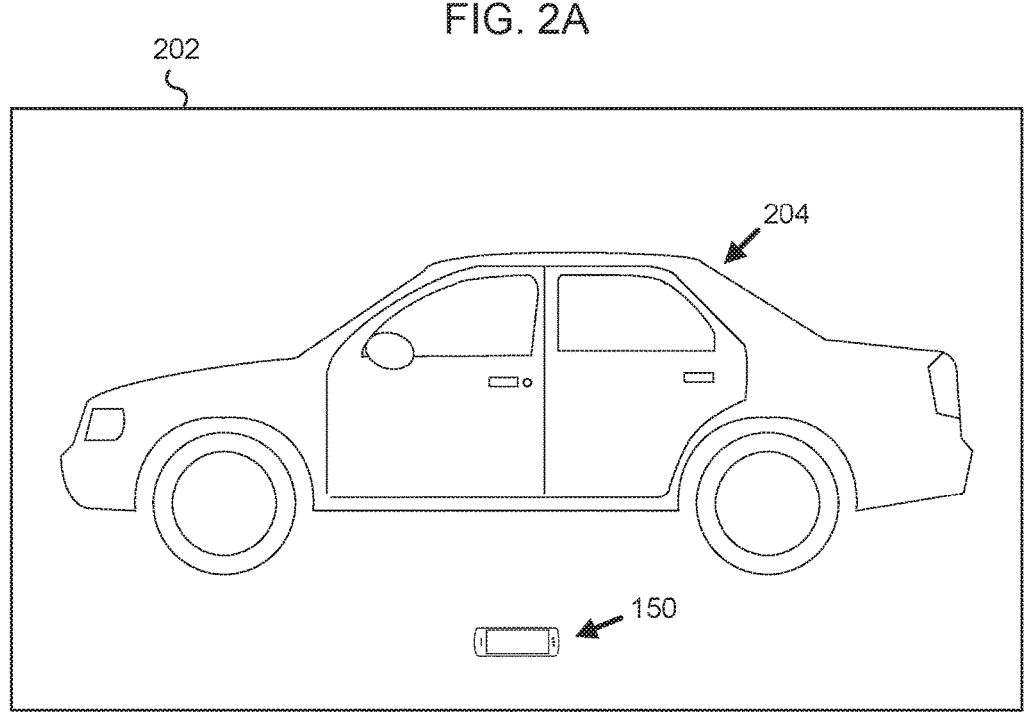

For example, and referring to FIG. 2A and FIG. 2B, image generation component 118 may be configured to generate an exterior image and/or interior image of virtual content 204 based on the position of display device 140 with respect to a reference frame of virtual content 204 and/or the position of display device 140 with respect to marker 150. As such, a user may visualize both the exterior and interior of a car (virtual content 204) in an augmented reality environment via display device 140. In an exemplary implementation, a user may choose features of a new car and build a custom virtual content object to visualize the car. Each of the features of the new car may comprise or be defined by one or more parameters of the virtual content object. Content management component 116 may be configured to generate and/or modify virtual content information defining the virtual content object (i.e., new car) based on the one or more parameters, store the virtual content information in electronic storage, and/or cause the virtual content information to be shared with and/or transmitted to one or more other users. For example, content management component 116 may cause the virtual content information to be shared with and/or transmitted to a dealer and/or other users. Image generation component 118 may be configured to generate an image of the virtual content object (i.e., new car) to be displayed in an augmented reality environment via display device 140 based on the virtual content information. In an exemplary implementation in which the virtual content object depicts a historical building or a historical monument, image generation component 118 may be configured to automatically generate images of the virtual content as a user's field of view changes, thus enabling a user to visualize a historical building such as the Pantheon or a historical monument such as Stonehenge from multiple angles or from the exterior or interior, all within in an augmented reality environment.

In various implementations, virtual content information may define a correlation between one or more linkage points and one or more points associated with virtual content. For example, one or more points defining a virtual content object (and its reference frame) in three-dimensional space may be correlated to one or more linkage points of marker 150. Therefore, a reference frame for virtual content may be anchored to multiple linkage points simultaneously. For example, and referring to FIG. 3A and FIG. 3B, image generation component 118 may be configured to generate an exterior image and/or interior image of virtual content 302 based on the position of display device 140 with respect to a reference frame of virtual content 204, the position of display device 140 with respect to marker 150, and/or the position of display device 140 with respect to one or more points defining virtual content 204 with respect to one or more linkage points of marker 150. As such, a user may visualize both the exterior and interior of a house (virtual content 302) in an augmented reality environment via display device 140. In an exemplary implementation, a user may identify a physical location in the real-world to associate with the virtual object (such as via an address, GPS coordinates, and/or other location information) and build and/or modify the house by selecting/modifying one or more parameters of the virtual content object. For example, a user may select one or more design features associated with a house, a size and/or position of the house and/or the one or more features, and/or other aspects of the house which may be defined by one or more parameters of the virtual content object. Content management component 116 may be configured to generate and/or modify virtual content information defining the virtual content object (i.e., the house) based on the one or more parameters, store the virtual content information in electronic storage, and/or cause the virtual content information to be shared with and/or transmitted to one or more other users. For example, content management component 116 may cause the virtual content information to be shared with and/or transmitted to a builder, architect, and/or other users. Image generation component 118 may be configured to generate an image of the virtual content object (i.e., the house) to be displayed in an augmented reality environment via display device 140 based on the virtual content information.

In various implementations, image generation component 118 may be configured to generate an image of virtual content based on virtual content information generated in response to a request to modify a virtual content object. In some implementations, image generation component 118 may be configured to generate the image of the modified virtual content object based on the virtual content information in real-time based on the request to modify the virtual content object.

In various implementations, image generation component 118 may be configured to generate an image of virtual content to appear simultaneously with another image of virtual content within an augmented reality environment. For example, a first set of virtual content based on a first reference frame may be depicted simultaneously with a second set of virtual content based on a second reference frame. In some implementations, virtual content associated with marker 150 may be depicted simultaneously with additional virtual content. For example, display device 140 may be displaying virtual content prior to coming within a proximity of marker 150. In some implementations, image generation component 118 may be configured to generate an image in which a first set of virtual content is overlaid on a second set of virtual content. In some implementations, sets of virtual content from different sources may be depicted by display device 140 simultaneously.

Display control component 120 may be configured to cause an image of one or more virtual content objects to be displayed in an augmented reality environment via display device 140. In various implementations, display control component 120 may be configured to effectuate transmission of instructions to display device 140. In various implementations, display control component 120 may be configured to generate and/or obtain instructions causing an image of one or more virtual content to be displayed via display device 140. In various implementations, display control component 120 may be configured to cause an image of a virtual content object to be displayed in an augmented reality environment via display device 140 and cause a modified image of the virtual content object to be displayed in the augmented reality environment via display device 140 in response to a request to modify the virtual content object. In some implementations, display control component 120 may be configured to cause the modified image of the virtual content object to be displayed in the augmented reality environment via display device 140 in response to a request to modify the virtual content object in real-time.

Remote interaction component 122 may be configured to facilitate remote interaction with virtual content objects by one or more other users. For example, remote interaction component may be configured to cause virtual content information to be accessible to one or more other users such that virtual content information (and the virtual content object) are viewable, modifiable, or otherwise accessible via a user device, display device, and/or other device associated with another user. Users interacting with a single virtual content object may be located in different physical locations, connected by a network (e.g., via a wide area network (WAN), local area network (LAN), the Internet, the Cloud, and/or another network). In some implementations, virtual content information and virtual content objects may be simultaneously viewed and/or modified by a user associated with display device 140 and another user. In some implementations, a virtual content object may be viewed in association with one or more linkage points via display device 140 and viewed in association with one or more different linkage points via a different display device associated with a different user. When viewed simultaneously by multiple users, the image of the virtual content object may be displayed or visualized differently based on the field of view of the user. In other words, a second image of a virtual content object displayed to a second user via a second display device is based on a second field of view of the second user.

In various implementations, remote interaction component 122 may be configured to facilitate simultaneous interaction with a virtual content object visualized in multiple augmented reality environment via multiple display devices associated with multiple users. In some implementations, a virtual content object may be simultaneously viewed in association with one or more linkage points via display device 140 and viewed in association with one or more different linkage points via a different display device associated with a different user. Thus, a single virtual content object may be viewed at the same or a different time at two different locations and/or by two different users via one or more display devices.

In an exemplary implementation, remote interaction component 122 may be configured to facilitate simultaneous interaction with a dynamic virtual content object depicting an interactive game. For example, remote interaction component 122 may be configured to enable one or more users that may or may not be remote from one another to play a game virtually in an augmented reality environment. For example, remote interaction component 122 may be configured to enable one or more users that may or may not be remote from one another to play a board game or table game virtually in an augmented reality environment. In various implementations, the virtual content information for a virtual content object depicting a game or one or more components of a game may define one or more rules associated with the game and/or information explaining how to play the game (i.e., instructions for playing the game). In some implementations, user interface component 114 may generate and provide to a user an interface that provides information defining one or more rules associated with a game and/or information explaining how to play a game based on the virtual content information for the virtual content object depicting the game.

In various implementations, the reference frame for an interactive space associated with a game (e.g., a board for a board game, a table for a table game, an interactive world for a role-playing game, and/or other interactive space associated with a game) may be anchored to a marker (i.e., marker 150) comprising one or more linkage points. The one or more linkage points may define a reference frame for the interactive space in the augmented reality environment. As such, the physical position of the linkage points in the real world may define the position of the reference frame of the interactive space in the augmented reality environment with respect to the real world. In some implementations, animations depicting one or more obstacles in a game may be displayed in an augmented reality environment based on one or more linkage points visible within a field of view of a user. For example, remote interaction component 122 may enable one or more users to participate in an online first-person shooter game in which virtual objects (e.g., aliens, zombies, spaceships, other vehicles, and/or other in-game components) move with respect to one or more linkage points. Thus, an interactive space associated with a game and the various components of the game may be depicted as one or more virtual content objects which may be perceived and interacted with in an augmented reality environment.

In an exemplary implementation, one or more virtual content objects depicted by system 100 may depict dice for a game (e.g., board game, table game, and/or other game) in the augmented reality environment. The virtual content information of a virtual content object depicting a die may define one or more aspects of the die. For example, the virtual content information may define the alphanumeric and/or symbolic characters on each side of the die, the number of sides of the die, and/or one or more other aspects of the die. In various implementations, a virtual content object depicting the die may be associated with a random number generator that randomly determines an alphanumeric and/or symbolic character for the virtual content object is activated (i.e., when the die is rolled). In some implementations, the possible outputs of the random number generator may each be associated with one or more sides of the virtual content object depicting the die. For example, the virtual content information for the virtual content object depicting the die may be associated with a random number generator that randomly determines a number between one and six for dice consisting of six sides with the numbers one through six each appearing on one of the six sides.

In various implementations, a virtual content object depicting die may be activated in response to user input. For example, the virtual content object depicting the die may be activated in response to physical input via a user device (e.g., display device 140 and/or one or more other devices), voice input, gesture-based input, and/or other types of user input. The physical input may comprise a request to roll one or more of the die depicted by one or more virtual content objects. When activated, an animation associated with a virtual content object depicting die may commence. The animation associated with the virtual content object may cause the die to appear to roll in the augmented reality environment. In various implementations, a virtual content object depicting the die may be associated with a virtual content object depicting an interactive space associated with a game. The die depicted by the virtual content object may be a component of the game. When activated, the virtual content object may move based on the reference frame of the associated virtual content object depicting the interactive space. Once being activated and an animation associated with the virtual content object is completed, the virtual content object may appear based on the output of the random number generator associated with the die. When activated, the random number generator may be prompted to provide an output. In some implementations, the possible outputs of the random number generator may each be associated with an animation of the virtual content object depicting the die. In other words, the animation of the virtual content object may be based on the output of the random number generator. For example, a random number generator associated with a virtual content object depicting die consisting of six sides with the numbers one through six each appearing on one of the six sides may provide an output of "four." Based on the output, the virtual content object depicting the die may appear with the side containing the character associated with "four" face up.

In some implementations, a virtual content object depicting an interactive space associated with a game may be associated with multiple virtual content objects depicting dice. In some implementations, each virtual content object depicting die may be associated with a separate random number generator. When the virtual content objects depicting dice are activated, an animation associated with each virtual content object may be commenced. In some implementations, the animations associated with the virtual content objects depicting the dice may commence or play simultaneously. Based on a separate output provided by each random number generator associated with each virtual content object, the outcome of the animation may be determined. For example, a first virtual content object depicting first die may be associated with a first random number generator that provides a first output of "three" when activated, and a second virtual content object depicting second die may be associated with a second random number generator that provides a second output of "five" when activated. Based on the first output and the second output, the animation of the first die and second die may result in the first die stopping with a side depicting a character associated with the number "three" face up and the second die stopping with a side depicting a character associated with the number "five" face up. In some implementations, a single random number generator may be associated with multiple virtual content objects depicting dice. When multiple virtual content objects depicting dice associated with a single random number generator are activated, the random number generator may be prompted to provide multiple outputs, and each of the multiple outputs may determine a result of an animation of one of the multiple virtual content objects.

In various implementations, remote interaction component 122 may be configured to facilitate numerous types of remote interactions with a virtual content object and/or images of a virtual content object in an augmented reality environment. In some implementations, one or more remote users may view duplicate virtual content objects and/or images of virtual content objects. The images of the duplicate virtual content objects and/or duplicate images of virtual content objects may be generated locally and displayed via display devices associated with the one or more users. Images of duplicate virtual content objects may comprise different images of the same virtual content object generated based on each individual user's field of view. Duplicate images of virtual content objects may be the same image displayed via multiple display devices but generated based on a single user's field of view.

In various implementations, multiple users may simultaneously view duplicate virtual content objects defined based on a single set of virtual content information and modifications made by any user viewing the duplicate virtual content objects may cause modified virtual content information to be generated. In some implementations, multiple users may individually modify a virtual content object irrespective of other users. For example, two users viewing the same virtual content object may each make individual requests to modify the virtual content object, wherein the requests to modify the virtual content object cause two modified virtual content objects to be generated, each associated with one of the two users. A user viewing a modified virtual content object in an augmented reality environment via display device 150 may receive an indication of a second, different, modified virtual content object based on user input from a second user requesting to modify the virtual content object. For example, user interface component 114 may cause the indication of the second modified virtual content object to be displayed to the user via a user interface, and display control component 120 may cause an image of the second modified virtual content object to be displayed in an augmented reality environment via display device 140 in response to a user request to view the second modified virtual content object.

In an exemplary implementation, remote interaction component 122 may be configured to provide visualizations of virtual content objects to one or more remote users in order to direct the activities of the one or more remote users. For example, a support team for a NASA mission in space may utilize modifications to virtual content objects depicted in an augmented reality environment to provide images of the virtual content objects to one or more remote users in space in order to visually convey simulations or instructions related to the mission.

In some implementations, multiple users may cooperatively modify a virtual content object. The multiple users may be in real-time communication when cooperatively modifying the virtual content object. The multiple users may be remote or located with close proximity. For example, multiple users sitting in the same room may cooperatively modify a virtual content object. Modifications made by individual users may be tracked and labeled in the augmented reality environment based on the user that made the modification. Cooperative modification of a virtual content object may be based on access controls and/or one or more other rules for modifying the virtual content object. For example, cooperative modification may be limited to one input at a time from the one or more users, users may be required to alternate or take turns between modifications (sequential), conflicting modifications in substance or time may be canceled or ignored, modifications may be based on a hierarchy defining a priority order between the one or more users, and/or based on one or more other rules for cooperatively modifying virtual content objects.

In some implementations, the access controls may specify one or more administrative users. Each modification made may be subject to approval by one or more administrative users. In some implementations, one or more administrative users may be predefined. For example, the creator of virtual content may define one or more administrative users associated with the virtual content. In some implementations, the one or more administrative users may change based on user input. For example, user interface component 114 may be configured to generate and provide to a user an interface that may receive requests to modify one or more administrative users, and content management 122 may be configured to modify the one or more administrative users associated with virtual content in response to request received via the interface. In some implementations, only administrative users for particular virtual content may change the one or more administrative users associated with that particular virtual content. For example, an administrative user may confer administrative user status on one or more other users.

In some implementations, any non-conflicting modifications made may be implemented and all conflicting modifications may be subject to the one or more access controls. For example, each conflicting modification may be subject to approval or input by one or more administrative users. In some implementations, all modifications may be subject to approval or input by one or more administrative users. In various implementations, remote interaction component 122 may be configured to prompt one or more administrative users to determine whether or not a requested modification is approved. For example, remote interaction component 122 may be configured to cause a prompt to be provided via a display device (e.g., display device 140) that requests user input from one or more administrative users that indicates whether the request to modify the virtual content object is approved. Based on user input received from the one or more administrative users, remote interaction component 122 may be configured to cause one or more modifications to be implemented. Implementing one or more modifications may comprise generating and/or modifying virtual content information based on the requested modifications and/or saving the virtual content information including the requested modifications.

In some implementations, remote interaction component 122 may be configured to facilitate cooperative modification of a virtual content object based on interactivity status information. Interactivity status information may indicate whether one or more users are modifying and/or otherwise interacting with a virtual content object. Based on interactivity status information and access controls and/or one or more other rules for modifying a virtual content object, remote interaction component 122 may be configured to prevent the modification of a virtual content object. For example, remote interaction component 122 may be configured to cause a message to be displayed via a display device indicating that a request to modify a virtual content object is denied based on interactivity status information and access controls and/or one or more other rules for modifying the virtual content object. As such, the modification of virtual content objects may be managed based on interactivity status information, access controls, and/or one or more other rules for modifying the virtual content objects.

In various implementations, remote interaction component 122 may be configured to manage the modification of a virtual content object by one or more users based on access controls associated with the virtual content object. Different access controls may be established for different virtual content information. Access controls may restrict users to accessing, downloading, uploading, modifying, storing, removing, and/or otherwise interacting with virtual content information. For example, access controls for virtual content information may comprise an indication of one or more rules for modifying the virtual content information.

In various implementations, remote interaction component 122 may be configured to facilitate the broadcast of a visualization of an augmented reality environment by a user via display device 140 to one or more other users viewing the broadcast via one or more other display devices. For example, remote interaction component 122 may be configured to transmit a recording of images rendered in an augmented reality environment via display device 140 to one or more user devices associated with other users. The recordings may be captured by an image capturing device associated with display device 140. In some implementations, remote interaction component 122 may be configured to facilitate a live stream of an augmented reality environment viewed via display device 140 to one or more other user devices. As such, a remote user may be able to view an augmented reality environment another user is viewing via display device 140 in real-time.

In some implementations, remote interaction component 122 may be configured to facilitate interaction between one or more users and a remote user comprising a three-dimensional printer. Based on a virtual content object, remote interaction component 122 may be configured to generate and transmit instructions to cause a remote user comprising a three-dimensional printer to print polymer components necessary to build and/or repair an object depicted by a virtual content object. For example, remote interaction component 122 may be configured to generate and transmit instructions to cause a remote user comprising a three-dimensional printer to print components to serve as biological tissue components, such as a defective heart valve generated based on a virtual content object depicting a human heart and the defective heart valve.

Electronic storage 130 may include electronic storage media that electronically stores information. The electronic storage media of electronic storage 130 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 130 may be a separate component within system 100, or electronic storage 130 may be provided integrally with one or more other components of system 100 (e.g., a user device, processor 110, or marker 150). Although electronic storage 130 is shown in FIG. 1 as a single entity, this is for illustrative purposes only. In some implementations, electronic storage 130 may comprise multiple storage units. These storage units may be physically located within the same device, or electronic storage 130 may represent storage functionality of multiple devices operating in coordination.

Electronic storage 130 may store software algorithms, information determined by processor 110, information received remotely, and/or other information that enables system 100 to function properly. For example, electronic storage 130 may store virtual content information, an indication of virtual content stored and/or accessible by the system, images generated by image generation component 118, sensor information (e.g., orientation information), device information, location information, and/or other information.

Display device 140 may be configured to present virtual content in an augmented reality environment. In various implementations, display device 140 may be configured to generate light and provide the light to an eye of a user such that the light forms images of the virtual content configured to be perceived in the augmented reality environment as if it were present in the real world. Display device 140 may include one or more of a display, one or more sensors, and/or other components. Presentation of virtual content via a display of display device 140 may be facilitated by control signals communicated to display device 140. For example, display control component 120 may be configured to communicate one or more control signals to display device 140. In some implementations, display device 140 may be configured to present content individually to each eye of a user as stereoscopic pairs.

Display device 140 may comprise any device capable of displaying a real-time view of a physical, real-world environment while superimposing images of virtual content over the real-time view of the physical, real-world environment. As such, display device 140 may comprise any device that includes and/or is communicatively coupled to an image capturing device (e.g., a camera) that may be used to capture a view of the real-world environment. In various implementations, display device 140 may comprise a smartphone, a tablet, a computer, a wearable device (e.g., a headset, a visor, glasses, contact lenses, and/or any other wearable device) and/or any other device configured to present views of virtual content in an augmented reality environment. In various implementations, display device 140 may include or be associated with one or more speakers for playing one or more sounds associated with a virtual content object. In some implementations, display device 140 may be arranged on, and/or may comprise part of, a headset (not shown in FIG. 1). When headset is installed on a user's head, the user's gaze may be directed towards display device 140 (or at least a display of display device 140) to view content presented by display device 140.

A display of display device 140 may include one or more of screen, a set of screens, a touchscreen, a monitor, a headset (e.g., a head-mounted display, glasses, goggles), contact lenses, and/or other displays. In some implementations, a display may include one or more of a transparent, semi-transparent, reflective, and/or semi-reflective display component, such as a visor, glasses, and/or contact lenses. Images of virtual content may be presented on the display component such that the user may view the images presented on the display component as well as the real-world through the display component. The virtual content may be perceived as being present in the real world. Such a configuration may provide an interactive space comprising an augmented reality environment. By way of non-limiting illustration, display device 140 may comprise an AR headset.

Individual sensors of display device 140 may be configured to generate output signals. An individual sensor may include an orientation sensor and/or other sensors. An orientation sensor of display device 140 may be configured to generate output signals conveying orientation information and/or other information. Orientation information derived from output signals of an orientation sensor may define an orientation of display device 140. In some implementations, orientation of display device 140 may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, and/or other devices. In various implementations, the orientation of display device 140 may be communicated to image generation component 118 to generate and/or update images of a virtual content object to be viewed via display device 140.

System 100 may include one or more devices configured to or capable of providing haptic features via tactile output. For example, a user device, display device 140, and/or one or more other components of system 100 may be configured to vibrate based on one or more parameters defining haptic features of virtual content. A haptic feature may comprise one or more effects associated with virtual content observed haptically. For example, effects observed haptically may comprise one or more of a vibration, a motion, a temperature, and/or other haptic effects observed via tactile output. Haptic features may be static or dynamic, and may be haptically observed at a time, over a period of time, at a location, and/or over a range of locations. For example, a haptic feature of a virtual content object may be triggered based on an indication that a user has viewed the virtual content object for a predefined period of time and/or from a predefined location associated with the virtual content object. The parameters of a virtual content object may define one or more triggers associated with one or more haptic features of the virtual content object.

Marker 150 may establish a reference frame for virtual content based on the position of marker 150 in the real world. In various implementations, marker 150 may comprise a physical object associated with multiple linkage points. The linkage points may comprise indicators, transponders, stitching points, and/or other identified points on marker 150. The linkage points associated with a marker may serve as an anchor for the reference frame of virtual content. As such, the position of the linkage points in the real world may define the reference frame of virtual content with respect to the real world. In some implementations, marker 150 may comprise a point established with a laser. For example, a user device associated with a user of display device 140, display device 140, and/or one or more other devices (e.g., one or more laser pointers and/or other laser emitting devices) may establish one or more linkage points in the real world based on a laser (e.g., a laser emitted from one or more laser diodes). In some implementations, multiple devices may establish a single set of linkage points that define the reference frame of virtual content with respect to the real world based on the positions identified by multiple lasers emitted by the multiple devices. In some implementations, marker 150 may be created for, and/or provided to, a user. In some implementations, marker 150 may comprise a physical object that serves as an anchor for the reference frame of virtual content irrespective of the virtual content. In some implementations, marker 150 may comprise a physical object created specifically for one or more virtual content objects. In some implementations, marker 150 may comprise a physical object that exists in the real world. For example, a physical object that exists in the real world may be associated with multiple linkage points and configured to serve as an anchor for the reference frame of virtual content.

In various implementations, marker 150 may comprise a standardized framework of linkage points that serve as an anchor for virtual content in an augmented reality environment. In some implementations, marker 150 may comprise a formed blank with identified linkage points on one or more interior and/or exterior surfaces of the formed blank. A formed blank may comprise any two-dimensional or three-dimensional object associated with multiple linkage points. For example, a formed blank comprising a flat surface (e.g., a section of 2×4 and/or other flat surface), a hollow cylinder (e.g., a soup can and/or other cylinder), and/or any other two-dimensional or three-dimensional object may serve as marker 150. In some implementations, a standardized framework of linkage points may comprise a set of specific geometric shapes (such as a plus ("+") sign) that may serve as an anchor for the reference frame of virtual content.

In some implementations, marker 150 may comprise a physical object of the same or a similar type as a virtual content object depicted based on marker 150. For example, marker 150 may comprise a cylindrical tube with a diameter similar to the diameter of a passenger jet serving as the anchor for a virtual content object depicting a plane. In an exemplary implementation in which marker 150 comprises a cylindrical tube serving as the anchor for a virtual content object depicting a plane, a user may be able to walk through marker 150 and visualize images of the exterior and interior of the virtual content object.

In some implementations, marker 150 may comprise a powered and Bluetooth enabled flash drive, a smartphone, a cellphone, a tablet, and/or any other wirelessly connectable device linked to a power source and associated with multiple linkage points. For example, marker 150 may comprise a sign post as described in co-pending U.S. patent application Ser. No. 15/707,854, entitled "SYSTEMS AND METHODS FOR UTILIZING A DEVICE AS A MARKER FOR AUGMENTED REALITY CONTENT,", the disclosure of which is hereby incorporated by reference in its entirety herein.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 110, electronic storage 130, display device 140, and marker 150 are shown to be connected to interface 102 in FIG. 1, any communication medium may be used to facilitate interaction between any components of system 100. One or more components of system 100 may communicate with each other through hard-wired communication, wireless communication, or both. For example, one or more components of system 100 may communicate with each other through a network. For example, processor 110 may wirelessly communicate with electronic storage 130. By way of non-limiting example, wireless communication may include one or more of the Internet, radio communication, Bluetooth communication, Bluetooth Low Energy (BLE) communication, Wi-Fi communication, cellular communication, infrared communication, or other wireless communication. Other types of communications are contemplated by the present disclosure.

Although processor 110 is illustrated in FIG. 1 as a single component, this is for illustrative purposes only. In some implementations, processor 110 may comprise multiple processing units. These processing units may be physically located within the same device, or processor 110 may represent processing functionality of multiple devices operating in coordination. For example, processor 110 may be located within a user device, display device 140, marker 150, and/or other components of system 100. In some implementations, processor 110 may be remote from a user device, display device 140, marker 150, and/or other components of system 100. Processor 110 may be configured to execute one or more components by software; hardware; firmware; some combination of software, hardware, and/or firmware; and/or other mechanisms for configuring processing capabilities on processor 110.

Furthermore, it should be appreciated that although the various instructions are illustrated in FIG. 1 as being co-located within a single processing unit, in implementations in processor(s) 110 include multiple processing units, one or more instructions may be executed remotely from the other instructions.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 110 may be programmed by one or more additional instructions that may perform some or all of the functionality attributed herein to one of the computer-readable instructions.

Exemplary Flowcharts of Processes

Figure 4:
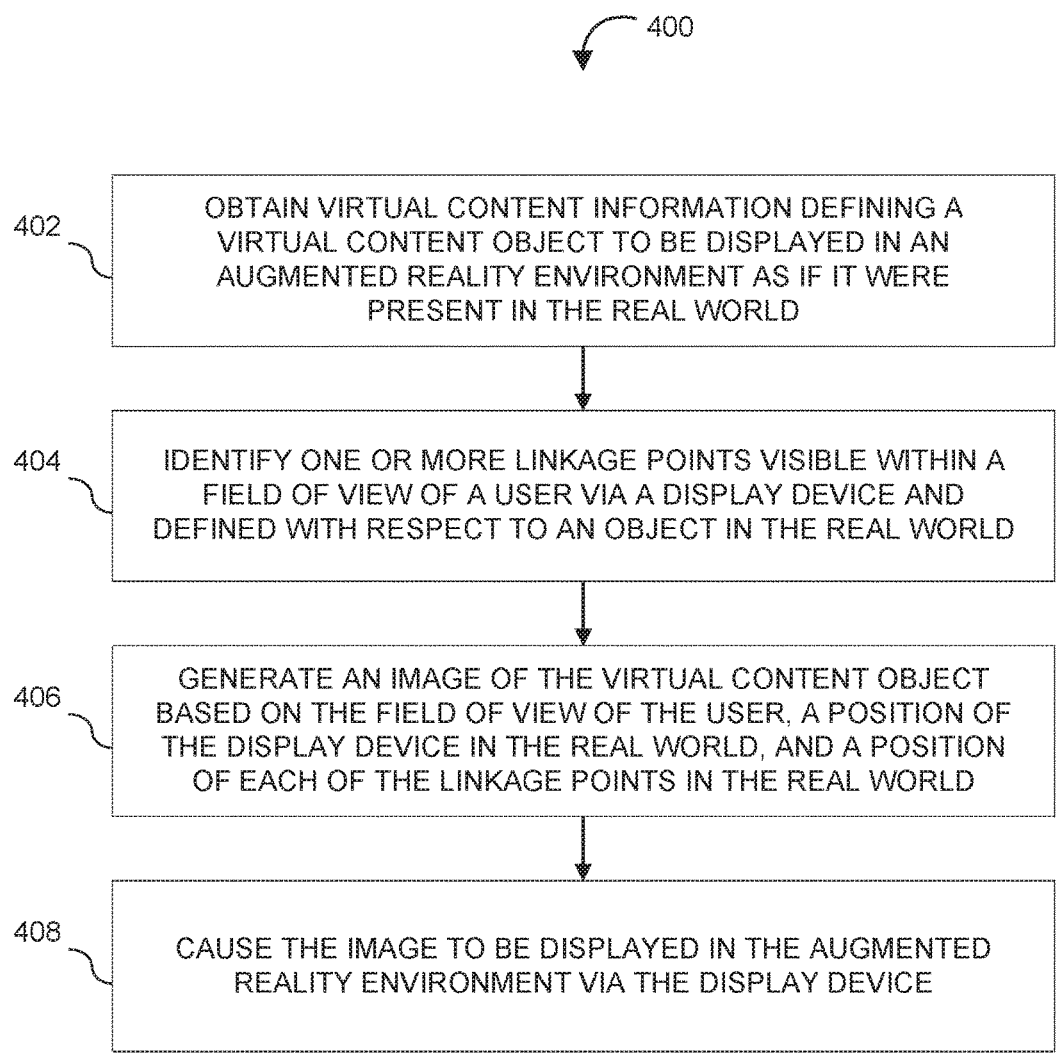
FIG. 4 illustrates a method for rendering a virtual content object in an augmented reality environment, in accordance with one or more implementations.

FIG. 4 illustrates a method 400 for rendering a virtual content object in an augmented reality environment, in accordance with one or more implementations. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 400 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 400 in response to instructions stored electronically on one or more electronic storage mediums. The one or more processing devices may include one or more devices configured through hardware, firmware, and/or software to be specifically designed for execution of one or more of the operations of method 400.

In an operation 402, method 400 may include obtaining virtual content information defining a virtual content object to be displayed in an augmented reality environment as if it were present in the real world. The virtual content information may define virtual content (or a set of virtual content), a reference frame of the virtual content, and/or a correlation between linkage points associated with a marker and the reference frame of the virtual content. For example, the virtual content information may comprise multiple parameters that define a virtual content object to be displayed in an augmented reality environment. In some implementations, operation 402 may be performed by a processor component the same as or similar to content management component 116 (shown in FIG. 1 and described herein).

In an operation 404, method 400 may include identifying one or more linkage points visible within a field of view of a user via a display device and defined with respect to an object in the real world. In some implementations, operation 404 may be performed by a processor component the same as or similar to image generation component 118 (shown in FIG. 1 and described herein).

In an operation 406, method 400 may include generating an image of the virtual content object based on the field of view of the user, a position of the display device in the real world, and a position of each of the linkage points in the real world. A user's field of view may be defined based on orientation information, location information, and/or other information. The linkage points may serve as an anchor for the reference frame of the virtual content object. As such, when rendered in an augmented reality environment by the display device, the virtual content object may appear within a user's field of view based on how the reference frame of the virtual content is correlated to the real world by virtue of the position of the linkage points in the real-world. In some implementations, operation 406 may be performed by a processor component the same as or similar to image generation component 118 (shown in FIG. 1 and described herein).

In an operation 408, method 400 may include causing the image to be displayed in the augmented reality environment via the display device. In some implementations, operation 508 may be performed by a processor component the same as or similar to display control component 120 (shown in FIG. 1 and described herein).

Figure 5:
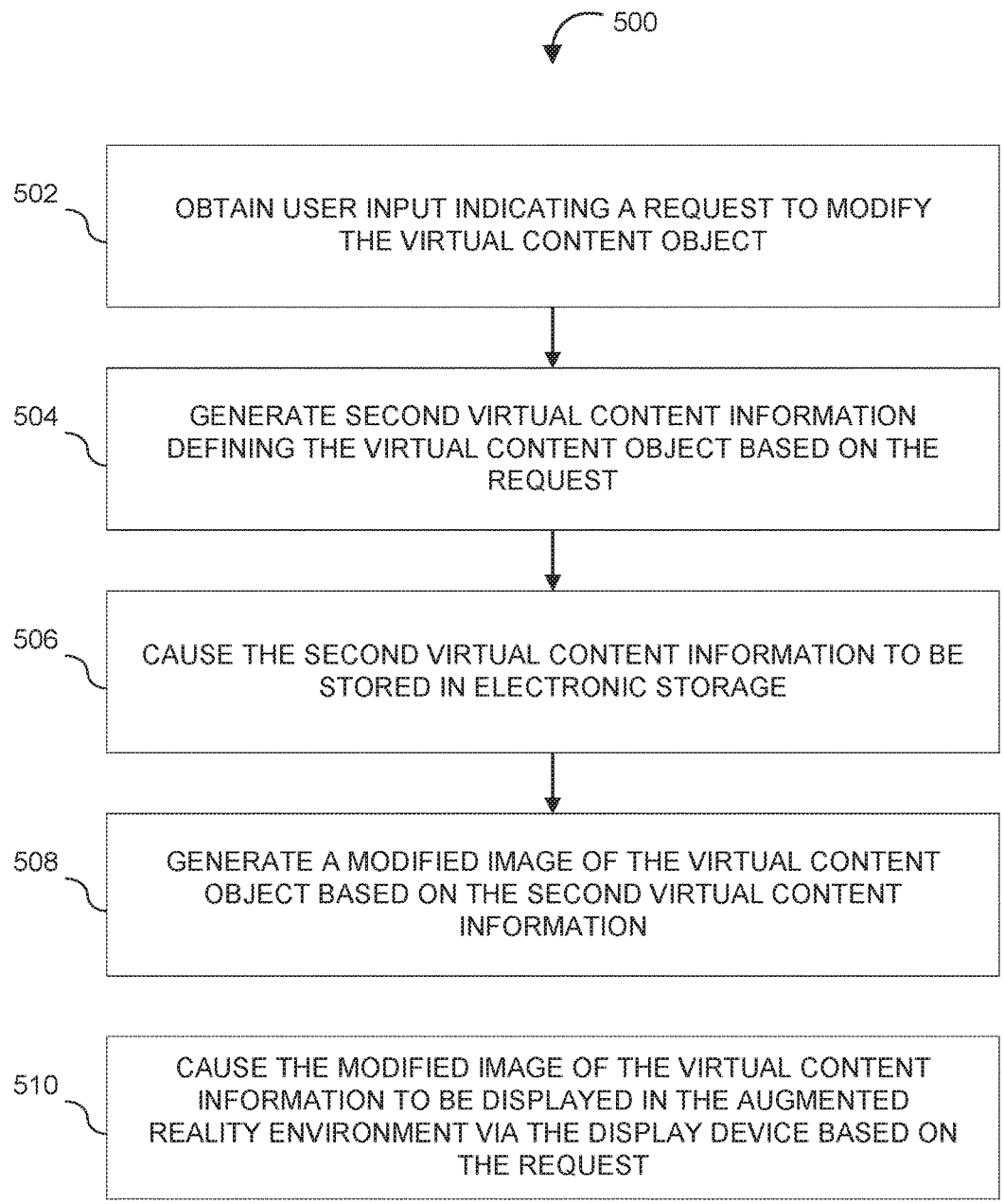
FIG. 5 illustrates a method for modifying a virtual content object rendered in an augmented reality environment, in accordance with one or more implementations.

FIG. 5 illustrates a method 500 for modifying a virtual content object rendered in an augmented reality environment, in accordance with one or more implementations. The operations of method 500 presented below are intended to be illustrative and, as such, should not be viewed as limiting. In some implementations, method 500 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 500 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 500 in response to instructions stored electronically on one or more electronic storage mediums. The one or more processing devices may include one or more devices configured through hardware, firmware, and/or software to be specifically designed for execution of one or more of the operations of method 500.

In an operation 502, method 500 may include obtaining user input indicating a request to modify the virtual content object. For example, the request to modify the virtual content object may comprise a request to modify one or more parameters defining the virtual content object. User input may comprise physical input, voice input, gesture-based input, input based on movement of the display device, input based on user eye movement, and/or other types of user input. In some implementations, operation 502 may be performed by a processor component the same as or similar to user interface component 114 and/or content management component 116 (shown in FIG. 1 and described herein).

In an operation 504, method 500 may include generating second virtual content information defining the virtual content object based on the request. For example, the second virtual content information may be generated by modifying virtual content information defining the virtual content object based on the request. In some implementations, the second virtual content information may be generated based on the request in real-time. In some implementations, operation 504 may be performed by a processor component the same as or similar to content management component 116 (shown in FIG. 1 and described herein).

In an operation 506, method 500 may include causing the second virtual content information to be stored in electronic storage. In various implementations, the virtual content information may be electronically stored at one or more devices of a user, electronic storage 130, marker 150, and/or other storage component accessible by system 100. For example, the virtual content information may be stored in cloud storage. In some implementations, virtual content information may be stored automatically or based on receipt of an indication from a user to store the virtual content information. In some implementations, operation 506 may be performed by a processor component the same as or similar to content management component 116 (shown in FIG. 1 and described herein).

In an operation 508, method 500 may include generating a modified image of the virtual content object based on the second virtual content information. In some implementations, operation 508 may be performed by a processor component the same as or similar to image generation component 118 (shown in FIG. 1 and described herein).

In an operation 510, method 500 may include causing the modified image of the virtual content object to be displayed in the augmented reality environment via a display device. In various implementations, the generated image is caused to be displayed in the augmented reality environment via the display device in real-time based on the request. In some implementations, operation 510 may be performed by a processor component the same as or similar to display control component 120 (shown in FIG. 1 and described herein).

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to render a virtual content object in an augmented reality environment based on a physical marker, the system comprising:
   a display device configured to generate light and provide the light to an eye of a user such that the light forms images of virtual content configured to be perceived in the augmented reality environment as though the virtual content were present in the real world;
   electronic storage configured to store virtual content information defining one or more virtual content objects and a correlation between multiple linkage points and a reference frame of each virtual content object, wherein a position of each of the multiple linkage points in the real world defines the reference frame with respect to the real world;
   one or more physical computer processors configured by computer readable instructions to:
      obtain first virtual content information from the electronic storage, wherein the first virtual content information defines the virtual content object based on multiple parameters;
      identify one or more linkage points visible within a field of view of a user via the display device and defined with respect to an object in the real world;
      generate an image of the virtual content object to be displayed in the augmented reality environment, wherein the image of the virtual content object is generated based on the first virtual content information, the field of view of the user, and the correlation between the multiple linkage points and the reference frame of the virtual content object; and
      cause the image to be displayed in the augmented reality environment via the display device.

2. The system of claim 1, wherein the one or more processors are further configured to:
   obtain user input from the user indicating a request to modify a first parameter of the multiple parameters of the virtual content object;
   generate second virtual content information defining the virtual content object based on the request, wherein the second virtual content information is different than the first virtual content information;
   cause the second virtual content information to be stored in electronic storage;
   generate a modified image of the virtual content object based on the second virtual content information; and
   cause the modified image of the virtual content object to be displayed in the augmented reality environment via the display device based on the request.

3. The system of claim 1, wherein the one or more processors are further configured to:
   receive an indication of multiple virtual content objects stored in the electronic storage, wherein the multiple virtual content objects include the virtual content object;
   cause a selectable list of the multiple virtual content objects to be presented to the user; and receive a selection indicating the virtual content object, wherein the virtual content information is obtained based on the selection.

4. The system of claim 1, wherein the field of a view of the user is defined based on location information and orientation information, the location information indicating at least a current location associated with the display device, and the orientation information indicating at least a pitch angle, a roll angle, and a yaw angle associated with the display device.

5. The system of claim 1, wherein the image of the virtual content object is generated based on a position of the display device, wherein the one or more processors are further configured to:
 obtain an indication of an updated position of the display device in the real world at a second time, wherein the updated position of the display device is different than the position of the display device; and
 cause an updated image of the virtual content object to be displayed in the augmented reality environment via the display device in real-time, wherein the updated image is generated based on the updated position of the display device in the real world.

6. The system of claim 2, wherein the one or more processors are further configured to:
 cause the first virtual content information defining the virtual content object to be accessible by a second user device of a second user, wherein the virtual content object is viewable via the display device and a second display device associated with the second user device simultaneously.

7. The system of claim 6, wherein the one or more processors are further configured to:
 receive an indication of a second modified image of the virtual content object, wherein the second modified image is different than the modified image and is based on second user input from the second user; and
 cause the second modified image of the virtual content object to be displayed in the augmented reality environment via the display device.

8. The system of claim 6, wherein the virtual content object is simultaneously viewable via the display device based on the one or more linkage points and via the second display device based on one or more second linkage points, wherein the one or more second linkage points are different than the one or more linkage points.

9. The system of claim 6, wherein the first virtual content information defines access controls for the virtual content object, the access controls identifying one or more rules for modifying the virtual content object and an administrative user of the user and the second user, wherein the one or more processors are further programmed to:
 receive an indication of a request to modify the first parameter of the multiple parameters of the virtual content object from the second user, wherein the request from the user and the request from the second user are conflicting;
 cause a prompt to be provided to the administrative user requesting an indication of whether the request to modify from the user or the request to modify from the second user is approved; and
 cause the second virtual content information to be generated based on the request from the user responsive to user input received from the administrative user indicating that the request to modify from the user is approved.

10. The system of claim 6, wherein the first virtual content information defines access controls for the virtual content object, the access controls identifying one or more rules for modifying the virtual content object and an administrative user of the user and the second user that must approve all requests to modify a virtual content object before they are implemented.

11. The system of claim 2, wherein the one or more processors are further configured to:
 cause the modified image of the virtual content object to be transmitted to a user device of a second user remote from the display device, wherein the transmitted modified image of the virtual content object is viewable via a second display device of the second user.

12. The system of claim 11, wherein the transmitted image of the modified image of the virtual content object is viewable via the second display device in real-time.

13. The system of claim 6, wherein a second image of the virtual content object displayed to a second user via a second display device is based on a second field of view of the second user, wherein the image of the virtual content object is different than the second image of the virtual content object.

14. The system of claim 1, wherein the image of the virtual content object displayed in the augmented reality environment is perceived as being the same size as an object depicted by the virtual content object would appear in the real world.

15. The system of claim 1, wherein the virtual content object is constructed based on a template associated with one or more predefined parameters, the one or more predefined parameters comprising at least an identification of the correlation between the multiple linkage points and the reference frame of the virtual content object.

16. The system of claim 1, wherein the virtual content object comprises an interactive space associated with a game, and wherein the one or more processors are further configured to:
 obtain second virtual content information defining a second virtual content object comprising die, wherein the second virtual content object is associated with the game and a first random number generator;
 obtain third virtual content information defining a third virtual content object comprising die, wherein the third virtual content object is associated with the game and a second random number generator;
 generate an image of the second virtual content object and an image of the third virtual content object to be displayed in the augmented reality environment;
 receive user input indicating a request to roll the dice depicted by the second virtual content object and the third virtual content object;
 responsive to the request to roll the dice, obtain an output of the first random number generator and an output of the second random number generator;
 cause the image of the second virtual content object to be animated, wherein animating the image of the second virtual content object causes the second virtual content object to appear to roll and an outcome of the roll is based on the output of the first random number generator, and wherein the animation of the image of the second virtual content object is based on a correlation between the reference frame of the virtual content object and a reference frame of the second virtual content object; and
 cause the image of the third virtual content object to be animated, wherein animating the image of the third virtual content object causes the third virtual content object to appear to roll and an outcome of the roll is based on the output of the second random number generator, and wherein the animation of the image of the third virtual content object is based on a correlation between the reference frame of the virtual content object and a reference frame of the third virtual content object.

* * * * *